United States Patent
Iwai

(10) Patent No.: US 10,235,574 B2
(45) Date of Patent: Mar. 19, 2019

(54) IMAGE-CAPTURING DEVICE, RECORDING DEVICE, AND VIDEO OUTPUT CONTROL DEVICE

(71) Applicant: PANASONIC INTELLECTUAL PROPERTY MANAGEMENT CO., LTD., Osaka (JP)

(72) Inventor: Kazuhiko Iwai, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 36 days.

(21) Appl. No.: 15/556,106

(22) PCT Filed: Mar. 3, 2016

(86) PCT No.: PCT/JP2016/001158
§ 371 (c)(1),
(2) Date: Sep. 6, 2017

(87) PCT Pub. No.: WO2016/147586
PCT Pub. Date: Sep. 22, 2016

(65) Prior Publication Data
US 2018/0025233 A1    Jan. 25, 2018

(30) Foreign Application Priority Data
Mar. 19, 2015   (JP) .................................. 2015-055830

(51) Int. Cl.
*G06K 9/00* (2006.01)
*H04N 5/225* (2006.01)
(Continued)

(52) U.S. Cl.
CPC ..... *G06K 9/00771* (2013.01); *G06K 9/00248* (2013.01); *H04N 5/225* (2013.01);
(Continued)

(58) Field of Classification Search
CPC ....................... G06K 9/00771; G06K 9/00248
See application file for complete search history.

(56) References Cited

U.S. PATENT DOCUMENTS

| 2009/0134968 A1 | 5/2009 | Girgensohn et al. |
| 2010/0013931 A1* | 1/2010 | Golan ................ G06K 9/00771 348/150 |
| 2015/0287214 A1* | 10/2015 | O'Gorman ......... G06K 9/00771 348/159 |

FOREIGN PATENT DOCUMENTS

| JP | 2009-134688 | 6/2009 |
| JP | 2011-248836 | 12/2011 |

OTHER PUBLICATIONS

International Search Report, dated May 24, 2016 by the Japan Patent Office (JPO), in International Application No. PCT/JP2016/001158.

* cited by examiner

*Primary Examiner* — Thai Q Tran
*Assistant Examiner* — Girumsew Wendmagegn
(74) *Attorney, Agent, or Firm* — Greenblum & Bernstein, P.L.C.

(57) ABSTRACT

A positional information acquirer acquires positional information for every person from a video, an attribute information acquirer acquires attribute information for every person from the video, and an activity information acquirer restricts activity information to an attribute designated by a user based on the attribute information and the positional information, and acquires the activity information of which the attribute is restricted. An activity map generator generates an activity map of which an attribute is restricted based on the activity information, and a video output outputs a video acquired by superimposing the activity map. A controller determines appropriateness indicating whether or not the (Continued)

video output from the imager is appropriate, enables a function of outputting the activity map of which the attribute is restricted, and disables the function of outputting the activity map of which the attribute is restricted where the video output from the imager does not have the appropriateness.

14 Claims, 19 Drawing Sheets

(51) Int. Cl.
*H04N 5/915* (2006.01)
*H04N 7/18* (2006.01)
*H04N 21/431* (2011.01)
*H04N 5/232* (2006.01)
*H04N 5/77* (2006.01)

(52) U.S. Cl.
CPC ........... *H04N 5/23219* (2013.01); *H04N 5/77* (2013.01); *H04N 5/915* (2013.01); *H04N 7/18* (2013.01); *H04N 21/431* (2013.01)

FOUR-SCREEN PTZ VIDEO

TARGET AREA

FIRST IMAGING MODE

SECOND IMAGING MODE

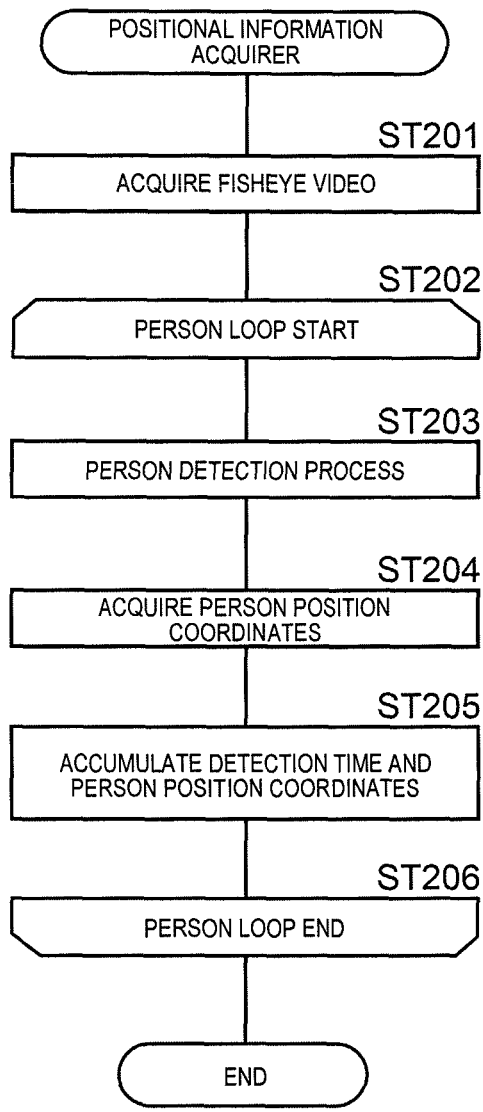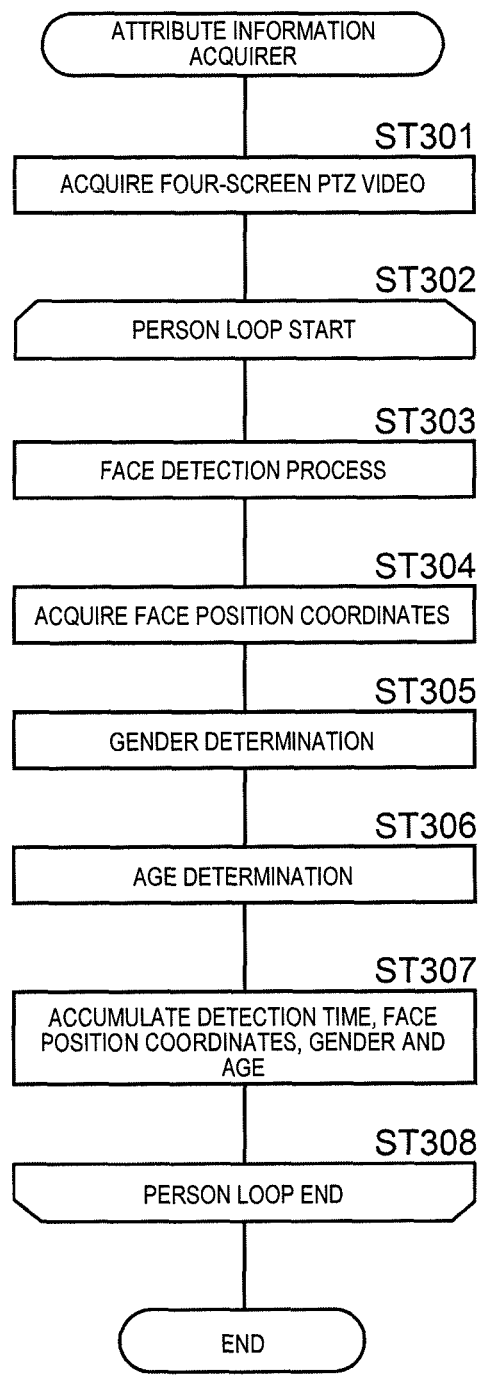
FIG. 8A / FIG. 8B

FIG. 11

| | | | |
|---|---|---|---|
| LANGUAGE SELECTION | | AUTOMATIC ▼ | |
| CAMERA TITLE | | xxxxxx | |
| DATE AND ITEM | DATE AND TIME | Dec▼ / 08▼ / 2014▼  14▼ : 23▼ : 52▼ | |
| | TIME DISPLAY FORMAT | 24h ▼ | |
| | DATE DISPLAY FORMAT | MM/DD/YYYY | |
| | NTP | MOVE TO NTP SETTING | |
| | TIME ZONE | GMT+09:00 OSAKA, SAPPORO, TOKYO | |
| | SUMMER TIME | Out ▼ | |
| | START DATE AND TIME | MONTH  DAY OF WEEK   TIME ▼ ▼ ▼ ▼ ▼ | |
| | END DATE AND TIME | MONTH  DAY OF WEEK   TIME ▼ ▼ ▼ ▼ ▼ | |
| IN-SCREEN CHARACTER DISPLAY | | ○ On    ⦿ Off | |
| IN-SCREEN CHARACTER (A TO Z, 0 TO 9, KANA) | Ch1 | | |
| | Ch1 | | |
| | Ch1 | | |
| | Ch1 | | |
| DATE AND TIME AND IN-SCREEN CHARACTER | DISPLAY POSITION | UPPER LEFT ▼ | |
| BRIGHTNESS STATE DISPLAY | | ⦿ On    ○ Off | |
| UPSIDE DOWN | | ○ On    ⦿ Off | |
| LAMP DISPLAY | | ⦿ TURN-ON    ○ TURN-OFF | |
| STATE NOTIFICATION INTERVAL | | ○ PERIODIC (30s)  ⦿ REAL TIME | |
| STATE NOTIFICATION RECEPTION PORT NUMBER | | 31004  (1~655353) | |
| PLUG-IN SOFTWARE | AUTOMATIC INSTALL | ⦿ PERMIT    ○ NOT PERMIT | |
| | LIVE SCREEN SMOOTH DISPLAY (BUFFERING) | ⦿ On    ○ Off | |
| MONITOR OUTPUT | | On ▼ | |

[SETTING]

Left menu:
- LIVE SCREEN | SETTING
- SETTING MENU
  - BASIC
  - CAMERA
  - MOVING OBJECT DETECTION
  - PERSON NUMBER COUNT
  - USER MANAGEMENT
  - NETWORK
  - SCHEDULE 52, 61, 62

FIG. 13

| MULTICAST ADDRESS | 239.192.0.20 | |
|---|---|---|
| MULTICAST PORT NUMBER | 37004 | (1024~50000) |
| MULTICAST TTL/HOPLimit | 16 | (1~254) |

| H.264(2) | | |
|---|---|---|
| H.264 DISTRIBUTION | ⦿ On | ○ Off |
| INTERNET MODE (over HTTP) | ○ On | ⦿ Off |
| RESOLUTION | FOUR-SCREEN/1280×960 ▼ | |
| DISTRIBUTION MODE | VARIABLE BIT RATE ▼ | |
| FRAME RATE | 7.5fps ▼ | |
| MAXIMUM BIT RATE | LOW ▼ | |
| CONTROL PERIOD | 24h ▼ | |
| BIT RATE PER CLIENT | MAXIMUM 14336kbps ▼ | ~MINIMUM 512kbps ▼ |
| IMAGE QUALITY | 1 HIGH QUALITY ▼ | |
| REFRESH INTERVAL | 1s ▼ | |
| DISTRIBUTION METHOD | UNICAST (PORT NUMBER SETTING: AUTO) ▼ | |
| UNICAST PORT NUMBER 1 (IMAGE) | 32014 | (1024~50000) |
| UNICAST PORT NUMBER 2 (SOUND) | 32014 | (1024~50000) |
| MULTICAST ADDRESS | 239.192.0.21 | |
| MULTICAST PORT NUMBER | 37004 | (1024~50000) |
| MULTICAST TTL/HOPLimit | 16 | (1~254) |

[SETTING]

IMAGE-CAPTURING DEVICE, RECORDING DEVICE, AND VIDEO OUTPUT CONTROL DEVICE

TECHNICAL FIELD

The present disclosure relates to an image-capturing device that images a monitoring area and outputs a video of the monitoring area to a browsing device, a recording device that accumulates the video output from the image-capturing device and outputs the video to the browsing device, and a video output control device that is connected to the image-capturing device and controls an output of a video to the browsing device.

BACKGROUND ART

In a store such as a convenience store, a monitoring system in which a camera that images an inside of the store is installed and a state of the inside of the store is monitored by using a video of the camera has been widely used. If an activity state of a customer within the store is able to be recognized by using the video of the camera, improvement measures of a merchandise display method within the store are prepared based on the activity state of the customer, and thus, it is possible to improve the sales and profits of the store.

In the related art, a technology that acquires information related to the activity state of the person in the monitoring area from videos of a plurality of cameras and generates an activity map acquired by visualizing the activity state has been known as a technology related to an analysis of an activity state of a person in a monitoring area (see PTL 1). In this technology, the activity map is illustrated with contour lines corresponding to activity levels of persons through color coding, and is displayed in the layout of the monitoring area so as to be superimposed thereon. A technology in which the monitoring area is divided into a plurality of blocks and a stay extent of the person is detected for every block has been known (see PTL 2). In this technology, a value (score) indicating the stay extent of the person is output for every block.

CITATION LIST

Patent Literature

PTL 1: Japanese Patent Unexamined Publication No. 2009-134688
PTL 2: Japanese Patent Unexamined Publication No. 2011-248836

SUMMARY OF THE INVENTION

For example, in order for a store manager to check a state of a customer corresponding to an attribute (customer base such as age or gender) of the person, there is a demand that an activity state of the person within the store is restricted to a specific attribute and the activity state of which the specific attribute is restricted is recognized. According to the technologies disclosed in PTL 1 and PTL 2, it is possible to easily recognize the overall activity state of the person in the monitoring area and a stay place where the persons gather, but the demand that the activity state of the person is restricted to the specific attribute and the activity state of which the specific attribute is restricted is recognized is not considered. There is a problem that such a demand is not able to be responded.

In the technologies disclosed in PTL 1 and PTL 2, since an activity map is output by installing software for analyzing the activity state of the person in an information processing device such as a PC, it is necessary to provide a dedicated device for analyzing the activity state, and thus, costs are increased. Accordingly, a technology capable of displaying the activity map with a simple system is needed. If the activity map is output with low accuracy, a user may perform erroneous determination, and the user may make an unnecessary effort. Thus, the usability of the user may be deteriorated, and thus, a technology capable of improving the usability of the user by previously preventing such inconvenience is needed.

The present disclosure has been made in order to solve the problems of the related arts, and a main object thereof is to provide an image-capturing device, a recording device, and a video output control device capable of displaying an activity map of which an attribute is restricted without providing a dedicated analysis device and improving the usability of a user when the activity map of which the attribute is restricted is browsed.

An image-capturing device of the present disclosure is an image-capturing device that images a monitoring area, and outputs a video of the monitoring area to a browsing device. The device includes: an imager that images the monitoring area, and outputs the video of the monitoring area according to an imaging mode; an input setter that sets the imaging mode and an attribute of a person in response to an operation input of a user; a positional information acquirer that detects persons from the video, and acquires positional information for every person; an attribute information acquirer that detects persons from the video, determines an attribute for every person, and acquires attribute information for every person; an activity information acquirer that restricts activity information corresponding to a position within the monitoring area to the attribute set by the input setter based on the attribute information and the positional information, and acquires the activity information of which the attribute is restricted; an activity map generator that generates an activity map of which the attribute is restricted based on the activity information; a video output unit that generates a video acquired by superimposing the activity map on the video of the monitoring area, and outputs the generated video; and a controller that performs control related to an output of the activity map. The controller determines appropriateness indicating whether or not the video output from the imager according to the imaging mode is appropriate in acquiring the attribute information, enables a function of outputting the activity map of which the attribute is restricted in a case where it is determined that the video output from the imager has the appropriateness, and disables the function of outputting the activity map of which the attribute is restricted in a case where it is determined that the video output from the imager does not have the appropriateness.

A recording device of the present disclosure is a recording device that accumulates a video output from an image-capturing device, and outputs the video to a browsing device. The device includes: a video input unit that receives the video, which is acquired by the image-capturing device which images the monitoring area, from the image-capturing device according to an imaging mode; a video accumulator that accumulates the video received by the video input unit; an input setter that sets the imaging mode and an attribute of a person in response to an operation input of a user; a positional information acquirer that detects persons from the video accumulated in the video accumulator, and acquires positional information for every person; an attribute information acquirer that detects persons from the video accumulated in the video accumulator, determines an attribute for every person, and acquires attribute information for every person; an activity information acquirer that restricts activity information corresponding to a position within the monitoring area to the attribute set by the input setter based on the attribute information and the positional information, and acquires the activity information of which the attribute is restricted; an activity map generator that generates an activity map of which the attribute is restricted based on the activity information; a video output unit that generates a video acquired by superimposing the activity map on the video of the monitoring area, and outputs the generated video; and a controller that performs control related to an output of the activity map. The controller determines appropriateness indicating whether or not the video output from the image-capturing device according to the imaging mode is appropriate in acquiring the attribute information, enables a function of outputting the activity map of which the attribute is restricted in a case where it is determined that the video output from the image has the appropriateness, and disables the function of outputting the activity map of which the attribute is restricted in a case where it is determined that the video output from the imager does not have the appropriateness.

A video output control device of the present disclosure is a video output control device that is connected to an image-capturing device, and controls an output of a video to a browsing device. The device includes; a video input unit that receives a video, which is acquired by the image-capturing device which images a monitoring area, from the image-capturing device according to an imaging mode; an input setter that sets the imaging mode and an attribute of a person in response to an operation input of a user; a positional information acquirer that detects persons from the video received by the video input unit, and acquires positional information for every person; an attribute information acquirer that detects persons from the video received by the video input unit, determines an attribute for every person, and acquires attribute information for every person; an activity information acquirer that restricts activity information corresponding to a position within the monitoring area to the attribute set by the input setter based on the attribute information and the positional information, and acquires the activity information of which the attribute is restricted; an activity map generator that generates an activity map of which the attribute is restricted based on the activity information; a video output unit that generates a video acquired by superimposing the activity map on the video of the monitoring area, and outputs the generated video; and a controller that performs control related to an output of the activity map. The controller determines appropriateness indicating whether or not the video output from the image-capturing device according to the imaging mode is appropriate in acquiring the attribute information, enables a function of outputting the activity map of which the attribute is restricted in a case where it is determined that the video output from the imager has the appropriateness, and disables the function of outputting the activity map of which the attribute is restricted in a case where it is determined that the video output from the imager does not have the appropriateness.

According to the present disclosure, since the output video acquired by superimposing the activity map of which the attribute is restricted on the video of the monitoring area is output from the image-capturing device, it is possible to display the activity map of which the attribute is restricted without providing a dedicated analysis device. In a case where the video output from the imager is not appropriate in acquiring the attribute information, since the function of outputting the activity map of which the attribute is restricted is disabled, it is possible to prevent the user from performing the erroneous determination caused by outputting the activity map of which the attribute is restricted with low accuracy, and thus, it is possible to improve the usability of the user.

BRIEF DESCRIPTION OF DRAWINGS

FIG. 8A is a flowchart showing a procedure of processes performed by positional information acquirer 24.

FIG. 8B is a flowchart showing a procedure of processes performed by attribute information acquirer 26.

FIG. 11 is an explanatory diagram showing a setting screen related a basic setting item displayed on monitor 7.

FIG. 13 is an explanatory diagram showing a setting screen related to a video output of camera 1 displayed on monitor 7.

DESCRIPTION OF EMBODIMENTS

Figure 1:
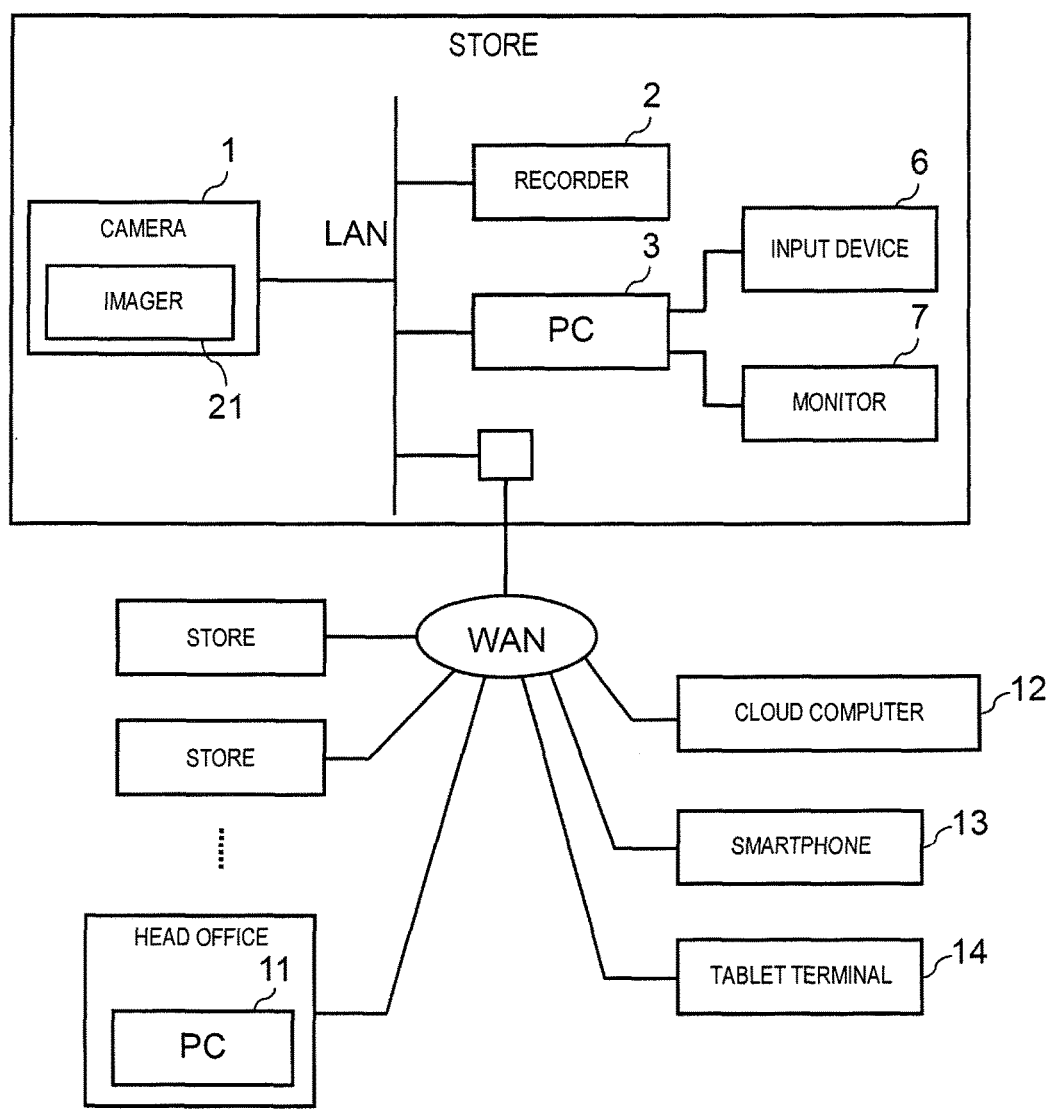
FIG. 1 is an overall configuration diagram of a monitoring system according to a first embodiment.

A first invention made in view of the above-described problem is an image-capturing device that images a monitoring area, and outputs a video of the monitoring area to a browsing device. The device includes: an imager that images the monitoring area, and outputs the video of the monitoring area according to an imaging mode; an input setter that sets the imaging mode and an attribute of a person in response to an operation input of a user; a positional information acquirer that detects persons from the video, and acquires positional information for every person; an attribute information acquirer that detects persons from the video, determines an attribute for every person, and acquires attribute information for every person; an activity information acquirer that restricts activity information corresponding to a position within the monitoring area to the attribute set by the input setter based on the attribute information and the positional information, and acquires the activity information of which the attribute is restricted; an activity map generator that generates an activity map of which the attribute is restricted based on the activity information; a video output unit that generates a video acquired by superimposing the activity map on the video of the monitoring area, and outputs the generated video; and a controller that performs control related to an output of the activity map. The controller determines appropriateness indicating whether or not the video output from the imager according to the imaging mode is appropriate in acquiring the attribute information, enables a function of outputting the activity map of which the attribute is restricted in a case where it is determined that the video output from the imager has the appropriateness, and disables the function of outputting the activity map of which the attribute is restricted in a case where it is determined that the video output from the imager does not have the appropriateness.

Accordingly, since the output video acquired by superimposing the activity map of which the attribute is restricted on the video of the monitoring area is output from the image-capturing device, it is possible to display the activity map of which the attribute is restricted without providing a dedicated analysis device. In a case where the video output from the imager is not appropriate in acquiring the attribute information, since the function of outputting the activity map of which the attribute is restricted is disabled, it is possible to prevent the user from performing the erroneous determination caused by outputting the activity map of which the attribute is restricted with low accuracy, and thus, it is possible to improve the usability of the user.

In a second invention, in a case where it is determined that the video output from the imager does not have the appropriateness, the controller causes the activity information acquirer to acquire activity information of which an attribute is not restricted, causes the activity map generator to generate an activity map of which the attribute is not restricted, and causes the video output unit to output a video acquired by superimposing the activity map of which the attribute is not restricted on the video of the monitoring area.

Accordingly, even in a case where the video output from the imager is not appropriate in acquiring the attribute information, since the activity map of which the attribute is not restricted, it is possible to improve the usability of the user.

In a third invention, the imager images the monitoring area through a fisheye lens, outputs a fisheye video, and outputs a correction video acquired by performing distortion correction on the fisheye video, and the controller determines that the video output from the imager does not have the appropriateness in a case where the video output from the imager is only the fisheye video.

Accordingly, since the attribute information is not able to be accurately acquired in the fisheye video and the attribute information is able to be accurately acquired in the correction video acquired by performing the distortion correction on the video, in a case where the video output from imager is only the fisheye video, it is determined that the video output from the imager does not have the appropriateness, and disables the function of outputting the activity map of which the attribute is restricted. Thus, since it is possible to prevent the user from performing the erroneous determination, it is possible to improve the usability of the user.

In a fourth invention, the imager images the monitoring area through a fisheye lens, outputs a fisheye video, and outputs a correction video acquired by performing distortion correction on the fisheye video, and the controller determines that the video output from the imager has the appropriateness in a case where the video output from the imager includes the correction video.

Accordingly, since the attribute information is not able to be accurately acquired in the fisheye video and the attribute information is able to be accurately acquired in the correction video acquired by performing the distortion correction on the video, in a case where the video output from imager is only the correction video, it is determined that the video output from the imager has the appropriateness, and enables the function of outputting the activity map of which the attribute is restricted. Thus, it is possible to reliably output the activity map of which the attribute is restricted with high accuracy.

A fifth invention is an image-capturing device that images a monitoring area, and outputs a video of the monitoring area to a browsing device. The device includes: an imager that outputs a first unprocessed video acquired by imaging the monitoring area and a second video acquired by cutting a part of the first video and performing distortion correction on the cut part according to an imaging mode; an input setter that sets the imaging mode and an attribute of a person in response to an operation input of a user; a positional information acquirer that detects persons from the first video, and acquires positional information on the first video for every person; an attribute information acquirer that detects persons from the second video, determines an attribute for every person, and acquires attribute information for every person; an identification processor that performs a process of correlating the positional information and the attribute information with each person; an activity information acquirer that restricts activity information corresponding to a position within the monitoring area to the attribute set by the input setter based on the positional information and the attribute information correlated by the identification processor, and acquires the activity information of which the attribute is restricted; an activity map generator that generates an activity map of which the attribute is restricted based on the activity information; and a video output unit that generates a video acquired by superimposing the activity map on the first video, and outputs the generated video.

Accordingly, since the output video acquired by superimposing the activity map of which the attribute is restricted on the video of the monitoring area is output from the image-capturing device, it is possible to display the activity map of which the attribute is restricted without providing a dedicated analysis device. Since the attribute information is acquired using the second video acquired by performing the distortion correction, it is possible to output the activity map of which the attribute is restricted with high accuracy. Thus, since it is possible to prevent the user from performing the erroneous determination caused by outputting the activity map of which the attribute is restricted with low accuracy, it is possible to improve the usability of the user. Since the overall imaging area is photographed on the first video, the activity map is superimposed on the first video, and thus, it is possible to recognize the activity state of the person of which the attribute is restricted in a wide range. Accordingly, it is possible to improve the usability of the user.

In a sixth invention, the positional information acquirer correlates the positional information for every person with detection time information on the first video for every person, and acquires the correlated positional information, the attribute information acquirer correlates the attribute information for every person with positional information and detection time information on the second video, and acquires the correlated attribute information, and the identification processor performs a process of correlating the positional information and the attribute information with each person based on the positional information and the detection time information respectively acquired by the positional information acquirer and the attribute information acquirer.

Accordingly, since the positional information acquired on the first video and the attribute information acquired from the second video are able to be accurately correlated with each other, it is possible to further improve the accuracy of the activity map of which the attribute is restricted.

In a seventh invention, the imager outputs, as the first video, a fisheye video acquired by imaging a monitoring area through a fisheye lens, cuts videos of a plurality of target areas set in response to an operation input of a user from the first video, performs distortion correction on the plurality of videos, and outputs, as the second video, a plurality of correction videos acquired through the distortion correction.

Accordingly, since the attribute information is able to be acquired for the person who appears in the first video without being missed by setting the area in which the person passes in the monitoring area as the target area of the second video, it is possible to output the activity map of which the attribute is restricted with high accuracy.

An eighth invention is a recording device that accumulates a video output from an image-capturing device, and outputs the video to a browsing device. The device includes: a video input unit that receives the video, which is acquired by the image-capturing device which images the monitoring area, from the image-capturing device according to an imaging mode; a video accumulator that accumulates the video received by the video input unit; an input setter that sets the imaging mode and an attribute of a person in response to an operation input of a user; a positional information acquirer that detects persons from the video accumulated in the video accumulator, and acquires positional information for every person; an attribute information acquirer that detects persons from the video accumulated in the video accumulator, determines an attribute for every person, and acquires attribute information for every person; an activity information acquirer that restricts activity information corresponding to a position within the monitoring area to the attribute set by the input setter based on the attribute information and the positional information, and acquires the activity information of which the attribute is restricted; an activity map generator that generates an activity map of which the attribute is restricted based on the activity information; a video output unit that generates a video acquired by superimposing the activity map on the video of the monitoring area, and outputs the generated video; and a controller that performs control related to an output of the activity map. The controller determines appropriateness indicating whether or not the video output from the image-capturing device according to the imaging mode is appropriate in acquiring the attribute information, enables a function of outputting the activity map of which the attribute is restricted in a case where it is determined that the video output from the image has the appropriateness, and disables the function of outputting the activity map of which the attribute is restricted in a case where it is determined that the video output from the imager does not have the appropriateness.

Accordingly, similarly to the first invention, it is possible to display the activity map of which the attribute is restricted without providing a dedicated analysis device, and it is possible to improve the usability of the user when the activity map of which the attribute is restricted is browsed.

A ninth invention is a recording device that accumulates a video output from an image-capturing device, and outputs the video to a browsing device. The device includes: a video input unit that receives a first unprocessed video, which is acquired by the image-capturing device which images a monitoring area, and a second video, which is acquired by the image-capturing device that cuts a part of the first video and performs distortion correction on the cut part, from the image-capturing device according to an imaging mode; a video accumulator that accumulates the first video and the second video received by the video input unit; an input setter that sets the imaging mode and an attribute of a person in response to an operation input of a user; a positional information acquirer that detects persons from the first video, and acquires positional information on the first video for every person; an attribute information acquirer that detects persons from the second video, determines an attribute for every person, and acquires attribute information for every person; an identification processor that performs a process of correlating the positional information and the attribute information with each person; an activity information acquirer that restricts activity information corresponding to a position within the monitoring area to the attribute set by the input setter based on the positional information and the attribute information correlated by the identification processor, and acquires the activity information of which the attribute is restricted; an activity map generator that generates an activity map of which the attribute is restricted based on the activity information; and a video output unit that generates a video acquired by superimposing the activity map on the first video, and outputs the generated video.

Accordingly, similarly to the fifth invention, it is possible to display the activity map of which the attribute is restricted without providing a dedicated analysis device, and it is possible to improve the usability of the user when the activity map of which the attribute is restricted is browsed.

A tenth invention is a video output control device that is connected to an image-capturing device, and controls an output of a video to a browsing device. The device includes: a video input unit that receives a video, which is acquired by the image-capturing device which images a monitoring area, from the image-capturing device according to an imaging mode; an input setter that sets the imaging mode and an attribute of a person in response to an operation input of a user; a positional information acquirer that detects persons from the video received by the video input unit, and acquires positional information for every person; an attribute information acquirer that detects persons from the video received by the video input unit, determines an attribute for every person, and acquires attribute information for every person; an activity information acquirer that restricts activity information corresponding to a position within the monitoring area to the attribute set by the input setter based on the attribute information and the positional information, and acquires the activity information of which the attribute is restricted; an activity map generator that generates an activity map of which the attribute is restricted based on the activity information; a video output unit that generates a video acquired by superimposing the activity map on the video of the monitoring area, and outputs the generated video; and a controller that performs control related to an output of the activity map. The controller determines appropriateness indicating whether or not the video output from the image-capturing device according to the imaging mode is appropriate in acquiring the attribute information, enables a function of outputting the activity map of which the attribute is restricted in a case where it is determined that the video output from the imager has the appropriateness, and disables the function of outputting the activity map of which the attribute is restricted in a case where it is determined that the video output from the imager does not have the appropriateness.

Accordingly, similarly to the first invention, it is possible to display the activity map of which the attribute is restricted without providing a dedicated analysis device, and it is possible to improve the usability of the user when the activity map of which the attribute is restricted is browsed.

An eleventh invention is a video output control device that is connected to an image-capturing device, and controls an output of a video to a browsing device. The device includes: a video input unit that receives a first unprocessed video, which is acquired by the image-capturing device which images a monitoring area, and a second video, which is acquired by the image-capturing device which cuts a part of the first video and performs distortion correction on the cut part, from the image-capturing device according to an imaging mode; an input setter that sets the imaging mode and an attribute of a person in response to an operation input of a user; a positional information acquirer that detects persons from the first video received by the video input unit, and acquires positional information on the first video for every person; an attribute information acquirer that detects persons from the second video received by the video input unit, determines an attribute for every person, and acquires attribute information for every person; an identification processor that performs a process of correlating the positional information and the attribute information with each person; an activity information acquirer that restricts activity information corresponding to a position within the monitoring area to the attribute set by the input setter based on the positional information and the attribute information correlated by the identification processor, and acquires the activity information of which the attribute is restricted; an activity map generator that generates an activity map of which the attribute is restricted based on the activity information; and a video output unit that generates a video acquired by superimposing the activity map on the first video, and outputs the generated video.

Accordingly, similarly to the fifth invention, it is possible to display the activity map of which the attribute is restricted without providing a dedicated analysis device, and it is possible to improve the usability of the user when the activity map of which the attribute is restricted is browsed.

Hereinafter, embodiments will be described with reference to the drawings.

First Embodiment

FIG. 1 is an overall configuration of a monitoring system according to a first embodiment. The monitoring system is established in a retail store such as a supermarket or a convenience store, and includes camera (image-capturing device) 1, recorder 2, and PC (browsing device) 3.

Camera 1 is provided in an appropriate place within a store (monitoring area), and an inside of the store is imaged by camera 1. Camera 1 is an omnidirectional camera having an image-capturing range of 360 degrees, and includes imager 21 that captures the monitoring area through a fisheye lens. Camera 1 is a so-called IP camera capable of being connected to a network, and recorder 2 is also capable of being connected to the network. Camera 1 and recorder 2 are connected to a LAN provided in the store, and videos output from camera 1 are accumulated in recorder 2.

PC 3 is also connected to the LAN, and videos output from camera 1 and recorder 2 are input to PC 3. The videos are displayed on a monitor (display device) 7 connected to PC 3. Accordingly, a user such as a manager of the store can browse the video of the inside of the store imaged by camera 1 in real time, and can browse the past video of the inside of the store recorded in recorder 2.

Camera 1, recorder 2, and PC 3 are installed in each of a plurality of stores, and PC 11 is provided in a head office that generally manages the plurality of stores. PC 11 is connected to camera 1 and recorder 2 of each store through a WAN. Accordingly, a user of the head office can browse the video of the inside of the store captured by camera 1 in real time, and can browse the past video of the inside of the store recorded in recorder 2.

Figure 2:
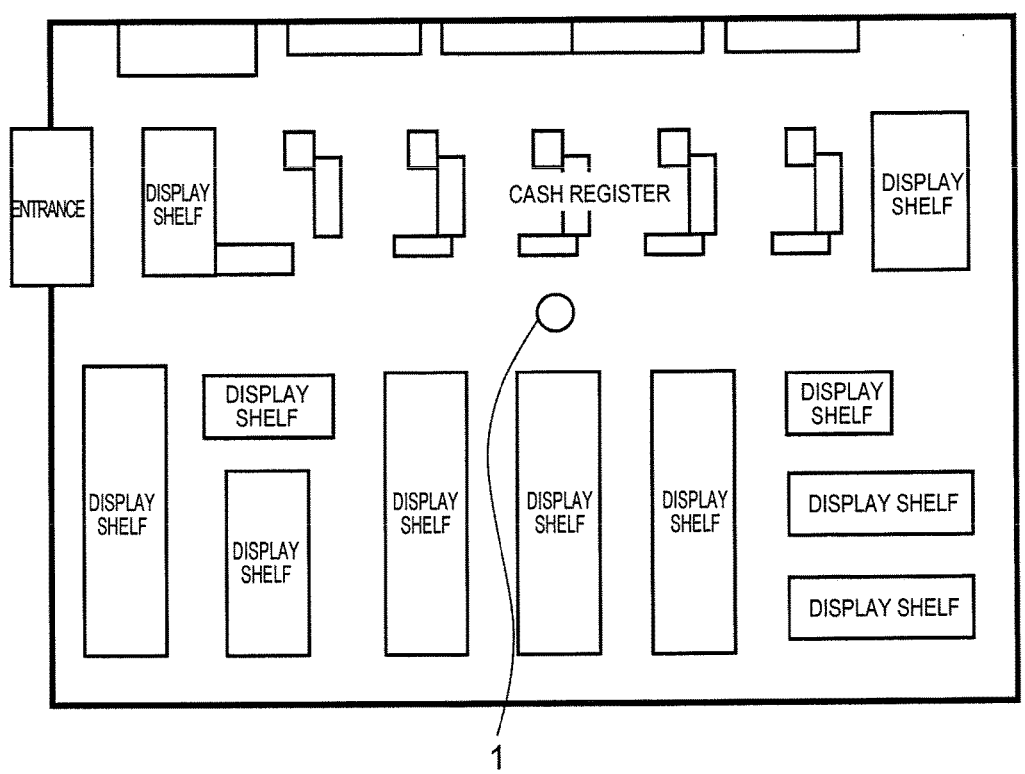
FIG. 2 is a plan view of a store for describing a layout of the store and an installation state of camera 1.

Hereinafter, a layout of the store and an installation state of camera 1 will be described. FIG. 2 is a plan view of the store for describing the layout of the store and the installation state of camera 1.

An entrance, display shelves, and a cash register are provided in the store. The display shelves are provided while being classified according to the kinds of pieces of merchandise such as fruits, fresh fish, meat, processed food, and beverage. A customer enters the store through the entrance, and moves through passages between the display shelves within the store. If the customer finds desired merchandise, the customer heads for the cash register with the desired merchandise, pays (money) for the merchandise in the cash register, and then leaves the store through the entrance.

Camera 1 that images the inside (monitoring area) of the store is installed in the store. Camera 1 is installed in an appropriate position of a ceiling of the store, and a person who stays within the store may be imaged by camera 1.

Figure 3A:
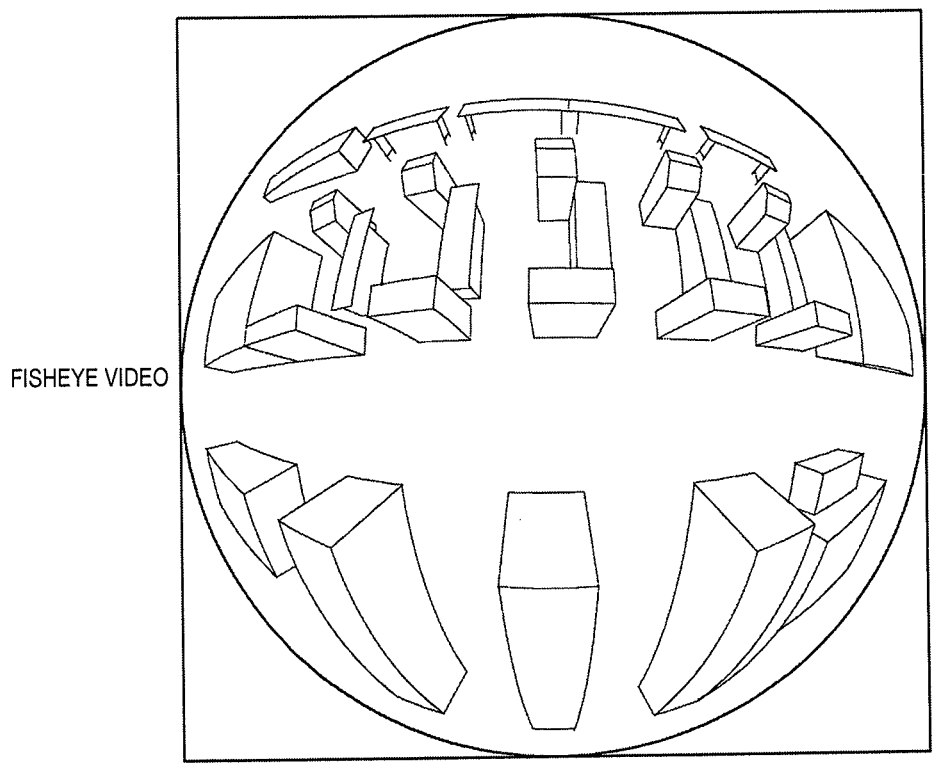
FIG. 3A is an explanatory diagram showing a fisheye video output from camera 1.
Figure 3B:
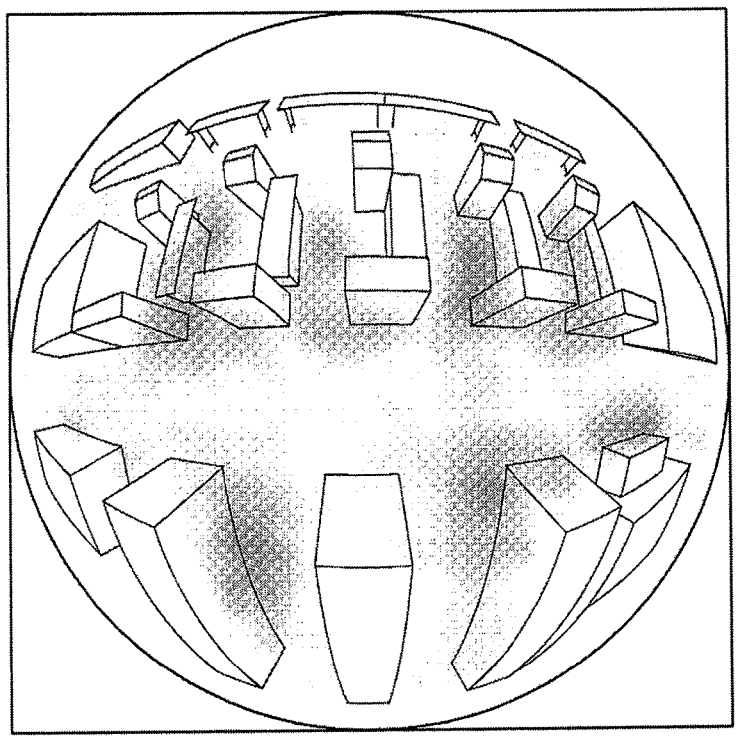
FIG. 3B is an explanatory diagram showing a video acquired by superimposing an activity map on the fisheye video of FIG. 3A.

Hereinafter, a fisheye video output from camera 1 shown in FIG. 1 will be described. FIG. 3A is an explanatory diagram showing the fisheye video output from camera 1, and FIG. 3B is an explanatory diagram showing a video acquired by superimposing an activity map on the video of the fisheye video of FIG. 3A.

Camera 1 images the monitoring area through the fisheye lens, and outputs the fisheye video (first video) as shown in FIG. 3A. In the present embodiment, an activity map acquired by visualizing an activity state of a person existing in the monitoring area is generated, and the video acquired by superimposing the activity map on the fisheye video is generated and output as shown in FIG. 3B.

In the present embodiment, a user designates an attribute (a customer base such as gender and age) of a person, and thus, an activity map restricted to the attribute may be generated. In a case where the attribute of the person is not designated, activity maps of all persons are generated.

Figure 4A:
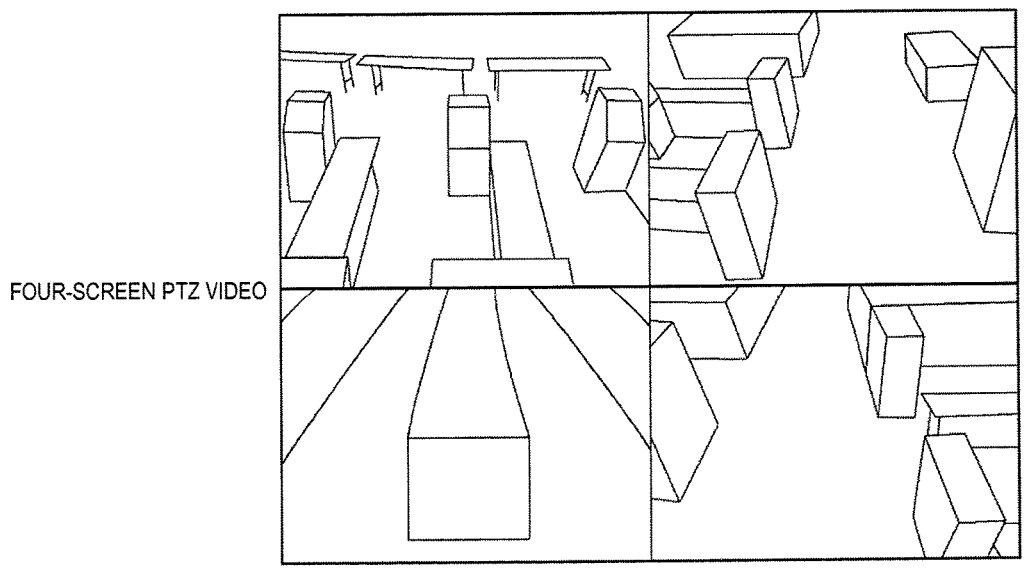
FIG. 4A is an explanatory diagram for describing an outline of a process of generating a four-screen PTZ video output from camera 1.
Figure 4B:
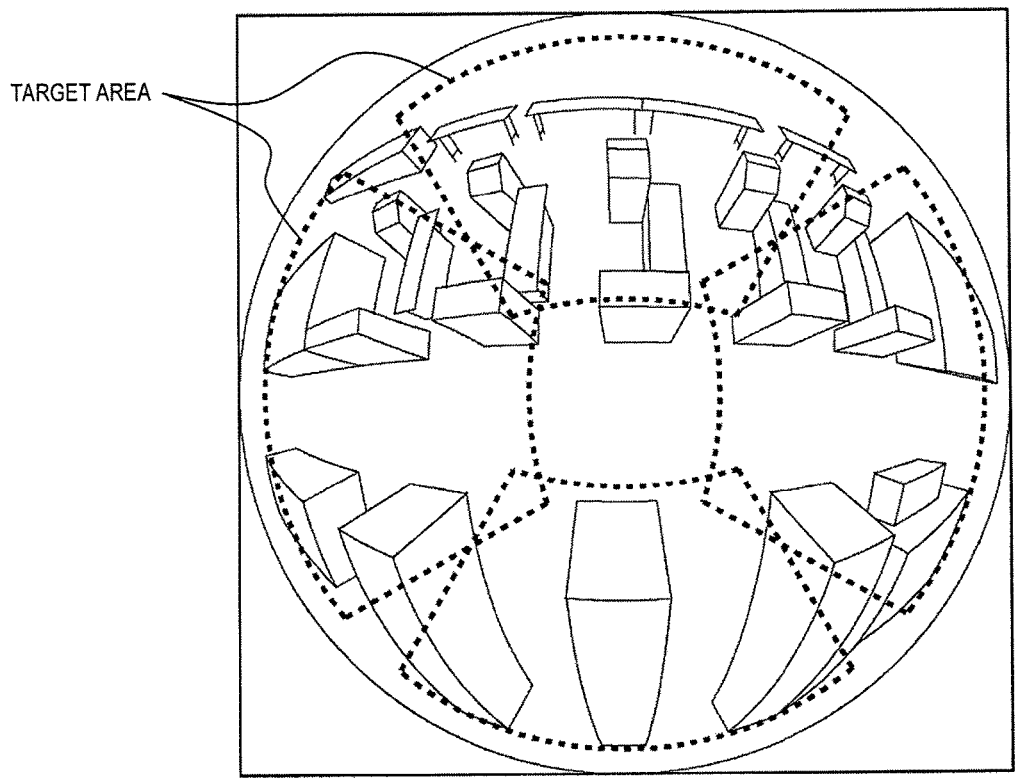
FIG. 4B is an explanatory diagram for describing an outline of a process of generating a four-screen PTZ video from the fisheye video.

Hereinafter, a four-screen PTZ video output from camera 1 shown in FIG. 1 will be described. FIG. 4A shows the four-screen PTZ video output from camera 1, and FIG. 4B is an explanatory diagram for describing an outline of a process of generating the four-screen PTZ video from the fisheye video. The four-screen PTZ video is acquired by correcting the distortion of videos of four designated places and displaying an image having an aspect of 4:3 on a multi-screen. Display positions of screens of the four-screen PTZ video may be changed through designating on the fisheye video. For example, a multi-screen video that may be acquired by using four box cameras of the related art is generated by one omnidirectional camera.

Camera 1 generates and outputs the four-screen PTZ video (second video) as shown in FIG. 4A. As shown in FIG. 4B, the four-screen PTZ video is acquired as a four-screen PTZ video including four correction videos by setting four target areas on an image area which does not include a central portion of the fisheye video, cutting videos of the four target areas from the fisheye video, and performing distortion correction on the videos of the four target areas.

The target areas are set in response to an operation input of a user by using input device 6. In this case, a target area setting screen on which the fisheye video is displayed may be displayed on monitor 7, and positions of the target areas within the fisheye video may be designated by the user. In the present embodiment, persons are detected from the four-screen PTZ video, an attribute is determined for every person, and a process of acquiring attribute information is performed for every person. Thus, image areas through which a person passes in the fisheye video are set as target areas, and thus, attribute information may be acquired for a person who appears in the fisheye video without being missed.

Camera 1 may output a one-screen PTZ video, a double-panorama video, or a single-panorama video in addition to the fisheye video and the four-screen PTZ video. The one-screen PTZ video is acquired by setting one target area on the fisheye video, cutting a video of the target area from the fisheye video, and performing distortion correction on the video. The double-panorama video is acquired by cutting the video in a state in which a ring-shaped image area except for the central portion of the fisheye video is divided into two areas and performing distortion correction on the video. The single-panorama video is acquired by cutting a video except for a bow-shaped image area which is present in a position symmetric with the center of the fisheye video from the fisheye video and performing distortion correction on the video.

Figure 5A:
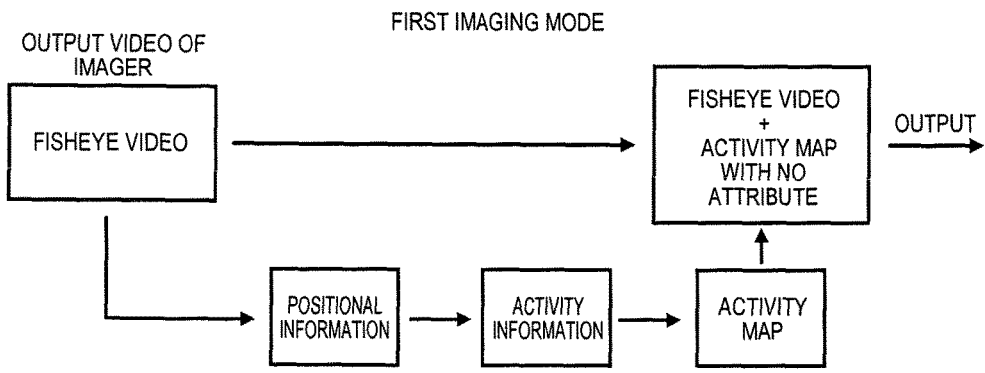
FIG. 5A is an explanatory diagram for describing an outline of processes performed by camera 1.
Figure 5B:
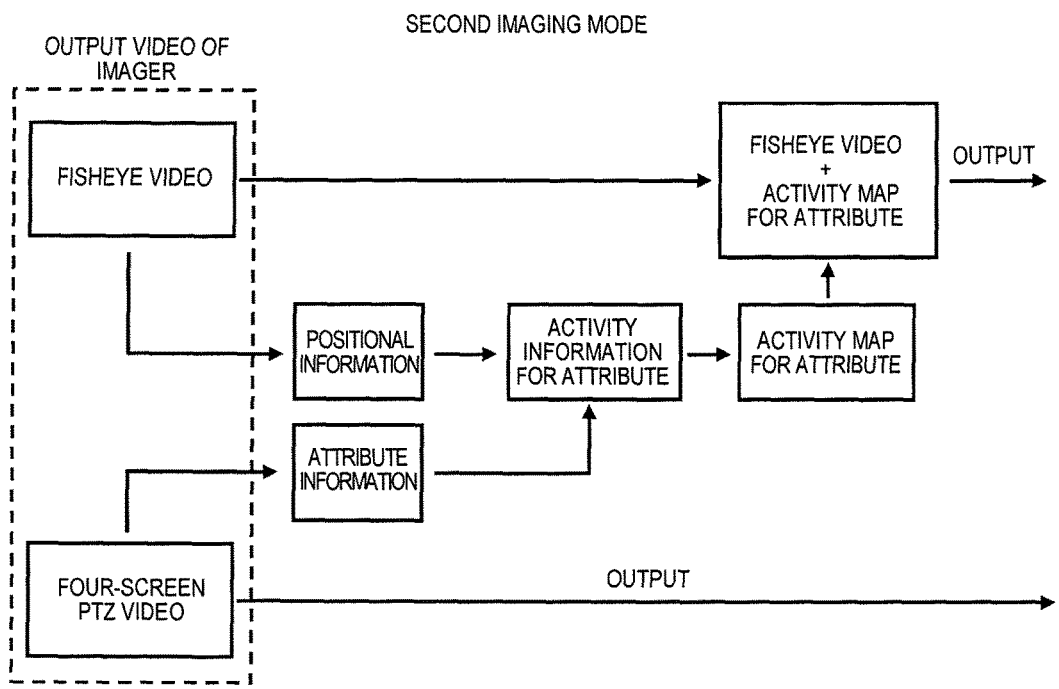
FIG. 5B is an explanatory diagram for describing the outline of the processes performed by camera 1.

Hereinafter, an outline of a process performed by camera 1 shown in FIG. 1 will be described. FIGS. 5A and 5B are explanatory diagrams for describing the outline of the process performed by camera 1.

Imager 21 of camera 1 has at least two imaging modes of a first imaging mode in which only the fisheye video is output as shown in FIG. 5A and a second imaging mode in which the fisheye video and the four-screen PTZ video are output as shown in FIG. 5B. In this example, since the distortion of a face image of a person is large and an attribute (customer base such as gender and age) is not able to be accurately determined, the fisheye video output in the first imaging mode is not appropriate in acquiring attribute information. Since the distortion of the face image of the person is fixed and the attribute is able to be accurately determined, the four-screen PTZ video output in the second imaging mode is appropriate in acquiring the attribute information.

Thus, in the present embodiment, in a case where the video output from imager 21 is only the fisheye video, that is, in the first imaging mode, it is determined that the video output from the imager is not able to be appropriate in acquiring the attribute information, and control for disabling a function of outputting the activity map of which the attribute is restricted is performed. That is, as shown in FIG. 5A, positional information for every person is acquired from the fisheye video, and activity information items of which an attribute is not restricted are acquired for all persons based on the positional information. Thereafter, an activity map in which the attribute is not restricted is generated based on the activity information, and a video acquired by superimposing the activity map on the fisheye video is generated and output.

In a case where the video output from imager 21 includes the four-screen PTZ video (correction video), that is, in the second imaging mode, it is determined that the video output from the imager is appropriate in acquiring the attribute information, and control for enabling the function of outputting the activity map of which the attribute is restricted is performed. That is, as shown in FIG. 5B, the positional information for every person is acquired from the fisheye video, and the attribute information for every person is acquired from the four-screen PTZ video. The activity information of which the attribute is restricted is acquired for a person corresponding to the designated attribute based on the positional information and the attribute information. The activity map of which the attribute is restricted is generated based on the activity information, and the video acquired by superimposing the activity map on the fisheye video is generated and output.

Thus, it is possible to accurately detect the position of the person existing in the monitoring area in the fisheye video acquired by imaging the monitoring area by camera 1 installed on the ceiling of the monitoring area. Thus, in the present embodiment, the positional information for every person is acquired from the fisheye video. Since the overall imaging area is photographed on the fisheye video, the activity map is superimposed on the fisheye video in the present embodiment, and thus, it is possible to recognize the activity state of the person of which the attribute is restricted in a wide range.

In the present embodiment, the positional information and the attribute information are respectively acquired from the fisheye video and the four-screen PTZ video. In this case, if a process of correlating the positional information acquired from the fisheye video and the attribute information acquired from the four-screen PTZ video with each person is performed, the activity information of which the attribute is restricted is not able to be acquired. Thus, in the present embodiment, it is determined the correspondence indicating whether or not the person detected in the fisheye video and the person detected in the four-screen PTZ video are the same person, and the process of correlating the positional information and the attribute information with each person is performed based on the correspondence.

Figure 6:
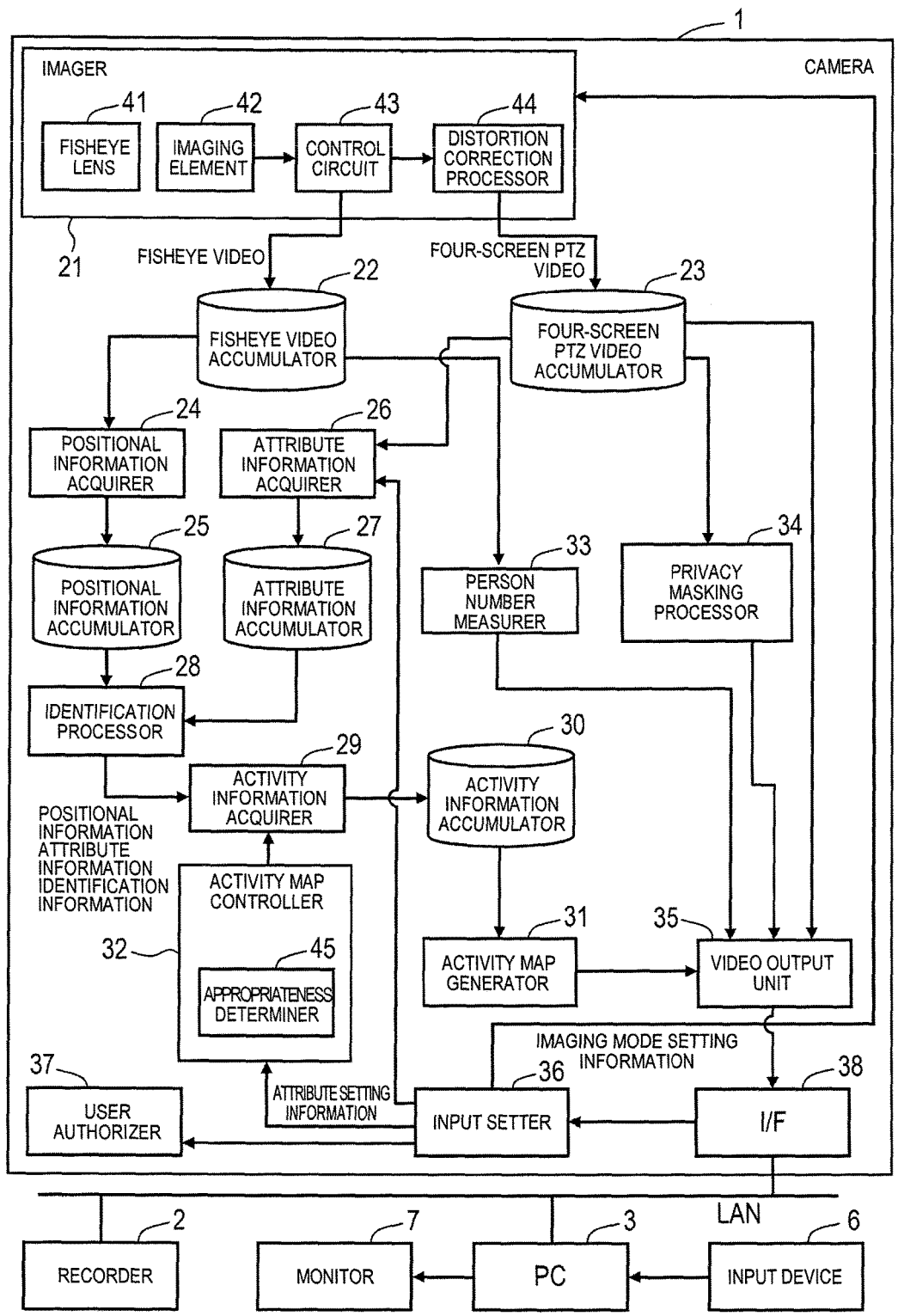
FIG. 6 is a functional block diagram showing a schematic configuration of camera 1.

Hereinafter, a schematic configuration of camera 1 shown in FIG. 1 will be described. FIG. 6 is a functional block diagram showing the schematic configuration of camera 1.

Camera 1 includes imager 21, fisheye video accumulator 22, four-screen PTZ video accumulator 23, positional information acquirer 24, positional information accumulator 25, attribute information acquirer 26, attribute information accumulator 27, identification processor 28, activity information acquirer 29, activity information accumulator 30, activity map generator 31, activity map controller 32, person number measurer 33, privacy masking processor 34, video output unit 35, input setter 36, user authorizer 37, and interface 38.

Imager 21 includes fisheye lens 41, imaging element 42, control circuit 43, and distortion correction processor 44. Imaging element 42 images the monitoring area through fisheye lens 41. Control circuit 43 outputs the fisheye video based on an output signal of imaging element 42.

Distortion correction processor 44 outputs a correction video acquired by performing the distortion correction on the fisheye video output from control circuit 43. In the present embodiment, as stated above, the videos of the four target areas set in response to the operation input of the user are cut from the fisheye video, the distortion correction is performed on the plurality of videos, and the plurality of correction videos acquired through the distortion correction, that is, the four-screen PTZ video is output.

Imager 21 has at least two imaging modes of the first imaging mode in which only the fisheye video is output and the second imaging mode in which the fisheye video and the four-screen PTZ video are output.

Fisheye video accumulator 22 accumulates the fisheye videos output from control circuit 43. Four-screen PTZ video accumulator 23 accumulates the four-screen PTZ videos output from distortion correction processor 44. Video accumulators 22 and 23 are storage devices such as a memory card, a hard disk drive, and a solid-state drive. Since these video accumulators are built in camera 1, a storage device having a relatively small capacity is adopted, and most recent videos are accumulated in a storage capacity range.

Positional information acquirer 24 performs a person detection process (moving object detection) of detecting the person from the fisheye video (frame) and acquires the positional information on the fisheye video for every person through the person detection process. In the person detection process, an Ω shape formed by the upper body of the person, that is, the head and the shoulder of the person is detected from the fisheye video, and a rectangular person area (person frame) surrounding this area is acquired. The person area may be set so as to surround the overall area in which the person exists, or the person area may be set on a floor near the area in which the person exists. A known moving object detection technology may be used as the person detection process. Positional information acquirer 24 correlates detection time information acquired from an imaging time of a video in which the person is detected with positional information for every person, and acquires the correlated positional information. Positional information and time information output from positional information acquirer 24 are accumulated in positional information accumulator 25.

Attribute information acquirer 26 detects the face of the person from the four-screen PTZ video (frame), determines the attribute (customer base such as gender and age) for every person, and performs the process of acquiring the attribute information for every person. Attribute information acquirer 26 correlates the detection time information acquired from the imaging time of the video in which the face of the person is detected and the positional information related to a detection position of the face of the person on the four-screen PTZ video with the attribute information for every person, and acquires the correlated attribute information. The attribute information, the positional information, and the time information output from attribute information acquirer 26 are accumulated in attribute information accumulator 27.

Identification processor 28 performs the process of correlating the positional information acquired by positional information acquirer 24 and the attribute information acquired by attribute information acquirer 26 with each person. Identification processor 28 determines the correspondence indicating whether or not the person detected in the fisheye video and the person detected in the four-screen PTZ video are the same person, and performs the process of correlating the positional information and the attribute information with each person based on the correspondence. Accordingly, it is possible to give the attribute to the person on the fisheye video.

Activity information acquirer 29 acquires a moving object activity value (activity information) indicating an activity level of the person corresponding to the position on the fisheye video based on the positional information of the person acquired by positional information acquirer 24. In the present embodiment, positional information acquirer 24 acquires the positional information related to the person area in every predetermined time defined by the imaging time of the frame. Activity information acquirer 29 counts the number of times each pixel (detection element) is positioned in the person area, and acquires the moving object activity value (counter value) for every pixel.

Specifically, the counter value of each pixel is increased by one whenever each pixel enters the person area, and the count of the person area for every pixel is continuously performed for a predetermined detection period. The moving object activity values for the pixels are sequentially acquired for every detection unit period. In a case where the pixel continuously enters the person area by a predetermined number of times (for example, three), the moving object activity value (counter value) may be increased by one in consideration of erroneous detection of the person area.

If the moving object activity values for the detection unit periods are sequentially acquired in this manner, a statistical process (for example, simple addition or averaging) of aggregating the moving object activity values for the detection unit periods is performed for an observation period (a target period of the activity map), and the activity information for the observation period is acquired. As the observation period, there are a period movement type (for example, observation is constantly performed for last 15 minutes) in which the observation period moves along a display time as a display time of a video progresses, a period extension type in which the observation period gradually extends as the display time of the video progresses with a display start time as its start point, and a period fixation type in which the observation period is fixed. Even in a case where the observation period is changed like the period movement type or the period extension type, the moving object activity values of the detection unit periods included in the observation period are aggregated, and thus, it is possible to acquire the activity information for the observation period.

Activity information acquirer 29 acquires any one of activity information of which an attribute is not restricted and activity information of which an attribute is restricted according to an instruction from activity map controller 32. When the activity information of which the attribute is not restricted is acquired, the process may be performed for all the persons, and when the activity information of which the attribute is restricted is acquired, the process may be performed for the person corresponding to the attribute set by input setter 36. In this case, since identification processor 28 correlates the positional information and the attribute information with each person, it is possible to extract the person corresponding to the set attribute from the persons detected in the fisheye video, and thus, it is possible to restrict the moving object activity value which corresponds to the position on the fisheye video to the set attribute and to acquire the moving object activity value of which the attribute is restricted.

The moving object activity value for every grid may be acquired by aggregating the moving object activity value for each pixel for every grid having a predetermined size, for example, by averaging the moving object activity values for a plurality of pixels positioned within the grid. Positional information related to a central point of the person area may be acquired, the number of times the central point of the person area is positioned within the grid may be counted, and the activity information for every grid may be acquired.

Activity map generator 31 performs a process of generating the activity map acquired by visualizing the activity state of the person in the monitoring area based on the moving object activity value acquired by activity information acquirer 29. In this example, in a case where activity information acquirer 29 acquires the activity information of which the attribute is not restricted, the activity maps indicating the activity states of all the persons are generated, and when the activity information of which the attribute is restricted is acquired, the activity map indicating the activity state of the person corresponding to the designated attribute. A display form (color, transmittance, or the like) of an activity map image may be previously set, or may be appropriately selected by the user.

Activity map controller 32 performs control related to the output of the activity map, and includes appropriateness determiner 45. Appropriateness determiner 45 determines the appropriateness indicating whether or not the video output from imager 21 according to the imaging mode set by input setter 36 is appropriate in acquiring the attribute information.

In a case where appropriateness determiner 45 determines that the video output from the imager 21 has the appropriateness, activity map controller 32 performs control for enabling the function of outputting the activity map of which the attribute is restricted. That is, activity information acquirer 29 acquires the activity information of which the attribute is not restricted. Activity map generator 31 generates the activity map of which the attribute is not restricted, generates the video acquired by superimposing the activity map of which the attribute is not restricted on the fisheye video, and outputs the generated video from video output unit 35. In a case where appropriateness determiner 45 determines that the video output from the imager does not have the appropriateness, the activity map controller performs control for disabling the function of outputting the activity map of which the attribute is restricted. That is, activity information acquirer 29 acquires the activity information of which the attribute is restricted. Activity map generator 31 generates the activity map of which the attribute is restricted, generates the video acquired by superimposing the activity map of which the attribute is restricted on the fisheye video, and outputs the generated video from video output unit 35.

Person number measurer 33 performs a process of measuring the number of persons who pass through a count line set on the video. Person number measurer 33 initially detects the persons from the video, and acquires a moving line for every person based on the positional information for every person. Subsequently, if it is detected that the moving line of the person crosses the count line set on the video based on the moving line for every person, the person number measurer determines that this person passes through the count line, and counts the number of persons. In this case, the number of persons passing through the count line is counted for every direction in which the person passes through the count line, and thus, it is possible to measure the number of persons for every direction.

Privacy masking processor 34 performs a masking process of changing an image area of a person to a mask image on the video, and generates a masking-processed video. Privacy masking processor 34 initially generates a background image acquired by removing an image (foreground image) of the person from the video, and acquires positional information of the image area of the person existing in the video based on the background image. The mask image corresponding to the image area of the person is generated based on the positional information of the image area of the area, and the masking-processed video acquired by superimposing the mask image on the background image is generated.

Input setter 36 sets an attribute of a person which is a target of the activity map and the imaging mode of imager 21 in response to the operation input of the user using input device 6 connected to PC 3.

User authorizer 37 retains authentication information related to a user who has an authority to browse the video output from camera 1, compares input information input by the user in PC 3 with the authentication information, and performs user authentication for verifying whether or not a user who browses the video in PC 3 is the user who has the authority to browse the video.

Interface 38 performs the transmission and reception of information between PC 3 and recorder 2 through the LAN.

Figure 7:
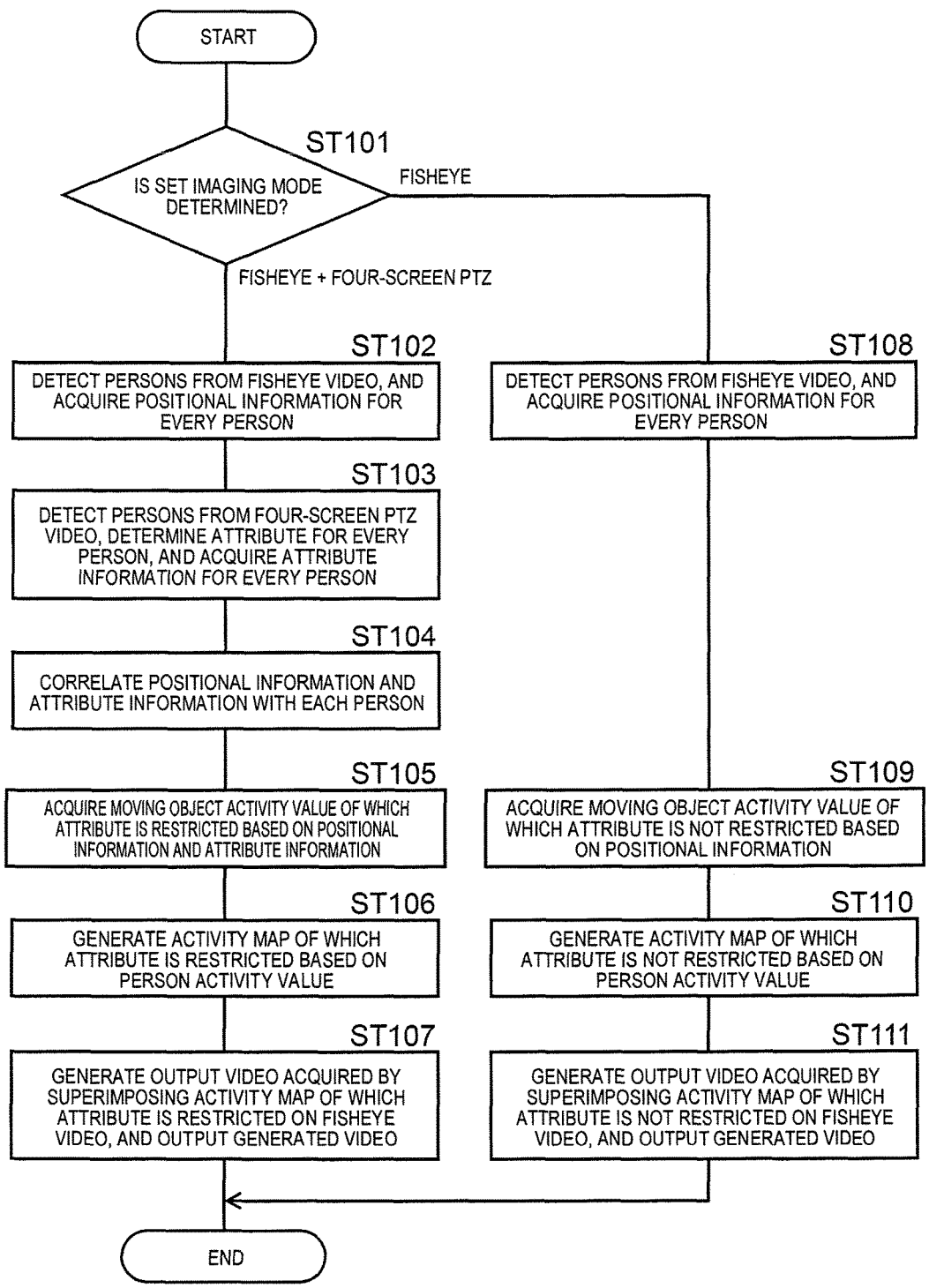
FIG. 7 is a flowchart showing a procedure of processes performed by the respective units of camera 1 when a video is output.

Hereinafter, a procedure of the processes performed by the respective units of camera 1, which are shown in FIGS. 5A and 5B when the video is output will be described. FIG. 7 is a flowchart showing the procedure of the processes performed by the respective units of camera 1 when the video is output.

In the present embodiment, imager 21 has at least two imaging modes of the first imaging mode in which the only the fisheye video is output and the second imaging mode in which the fisheye video and the four-screen PTZ video are output, and input setter 36 previously sets the imaging mode in response to the operation input of the user. Input setter 36 previously sets the attribute of tape person which is the target of the activity map in response to the operation input of the user.

When the video is output, the imaging mode is initially determined (ST101). In this example, in a case where the imaging mode set by input setter 36 is the second imaging mode in which the fisheye video and the four-screen PTZ video are output ("fisheye+four-screen PTZ" in ST101), positional information acquirer 24 detects the persons from the fisheye video, and acquires the positional information on the fisheye video for every person (ST102). Attribute information acquirer 26 detects the persons from the four-screen PTZ video, determines the attribute (customer base such as age or gender) for every person, and acquires the attribute information for every person (ST103).

Subsequently, identification processor 28 performs the process of correlating the attribute information and the positional information with each person (ST104). Activity information acquirer 29 acquires the moving object activity value of which the attribute is restricted for the person having the attribute set by input setter 36 based on the attribute information and the positional information correlated by identification processor 28 (ST105).

Activity map generator 31 generates the activity map of which the attribute is restricted based on the moving object activity value of which the attribute is restricted (ST106), and video output unit 35 generates an output video acquired by superimposing the activity map of which the attribute is restricted on the fisheye video, and outputs the generated output video to monitor 7 (ST107).

In a case where the imaging mode set by input setter 36 is the first imaging mode in which only the fisheye video is output ("fisheye" in ST101), positional information acquirer 24 initially detects the persons from the fisheye video, and acquires the positional information on the fisheye video for every person (ST108).

Subsequently, activity information acquirer 29 acquires the moving object activity value of which the attribute is not restricted for all the persons based on the positional information for every person (ST109).

Activity map generator 31 generates the activity map of which the attribute is not restricted based on the moving object activity value of which the attribute is not restricted (ST110), and video output unit 35 generates an output video acquired by superimposing the activity map of which the attribute is not restricted on the fisheye video, and outputs the generated output video to monitor 7 (ST111).

Hereinafter, the processes performed by positional information acquirer 24 and attribute information acquirer 26 shown in FIG. 6 will be described. FIG. 8A is a flowchart showing a procedure of processes performed by positional information acquirer 24. FIG. 8B is a flowchart showing a procedure of processes performed by attribute information acquirer 26.

Positional information acquirer 24 initially acquires the fisheye video (frame) from imager 21 as shown in FIG. 8A (ST201). A process for every person who appears in the fisheye video is started (ST202). In this example, a process of detecting the persons from the fisheye video is performed (ST203). Subsequently, a process of acquiring position coordinates of the detected person is performed (ST204). The position coordinates and the detection times of the persons are accumulated in positional information accumulator 25 (ST205). The above-described processes are repeated until the processes for all the persons who appear in the fisheye video are ended (ST206).

Attribute information acquirer 26 initially acquires the four-screen PTZ video from imager 21 as shown in FIG. 8B (ST301). A process for each of the faces of the persons who appear in the four-screen PTZ video is started (ST302). In this example, a process of detecting the face of the person from the four-screen PTZ video is performed (ST303). Subsequently, a process of acquiring position coordinates of the detected person is performed (ST304). Thereafter, a process of determining the gender of the person from an image of the face of the detected person is performed (ST305). A process of determining the age of the person from the image of the face of the detected person is performed (ST306). The attribute information (gender and age) and the positional coordinates and the detection time of the face are accumulated in attribute information accumulator 27 (ST307). The above-described processes are repeated until the processes for the faces of all the persons who appear in the four-screen PTZ video are ended (ST308).

Figure 9:
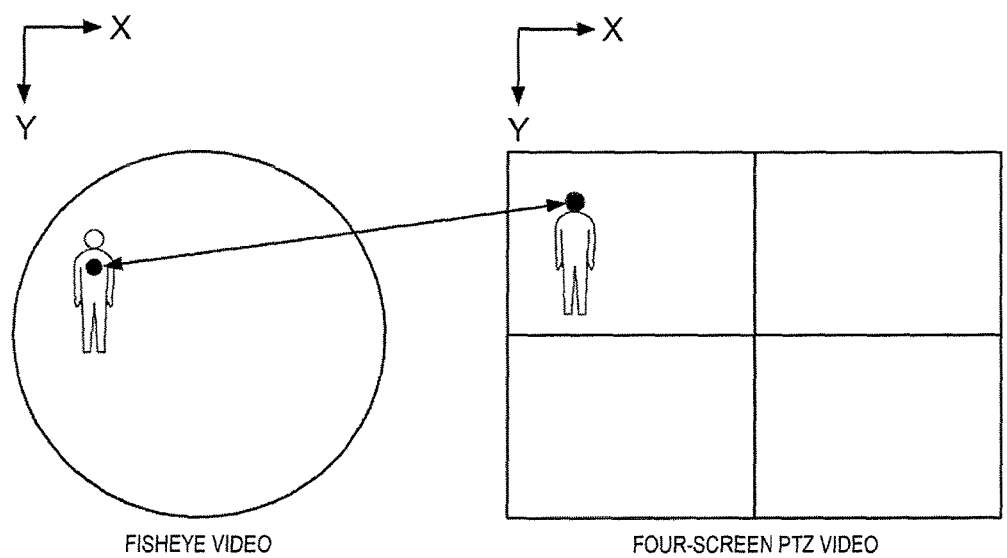
FIG. 9 is an explanatory diagram for describing processes performed by identification processor 28.

Hereinafter, the processes performed by identification processor 28 shown in FIG. 6 will be described. FIG. 9 is an explanatory diagram for describing the processes performed by identification processor 28.

In the present embodiment, positional information acquirer 24 detects the person from the fisheye video, and acquires the positional information on the fisheye video for every person. Attribute information acquirer 26 detects the persons from the four-screen PTZ video, and acquires the attribute information for every person. Identification processor 28 performs a process of correlating the positional information and the attribute information with each person.

In this case, identification processor 28 determines the correspondence indicating whether or not the person detected in the fisheye video and the person detected in the four-screen PTZ video are the same person based on the detection times and the detection positions. That is, if the detection times and the detection positions substantially match each other in the fisheye video and the four-screen PTZ video, it is determined that the detected persons are the same person. Accordingly, the positional information of the person detected in the fisheye video and the attribute information of the person detected in the four-screen PTZ video may be correlated with each person.

In this example, coordinate systems are individually set to the fisheye video and the four-screen PTZ video, and the coordinates of the same person are different between the fisheye video and the four-screen PTZ video. In the present embodiment, coordinate relation information related to the correspondence between the coordinates on the fisheye video and the coordinates on the four-screen PTZ video are retained in a memory of camera 1, and it is determined whether or not the detection positions of the person substantially match each other in the fisheye video and the four-screen PTZ video based on the coordinate relation information.

Figure 10:
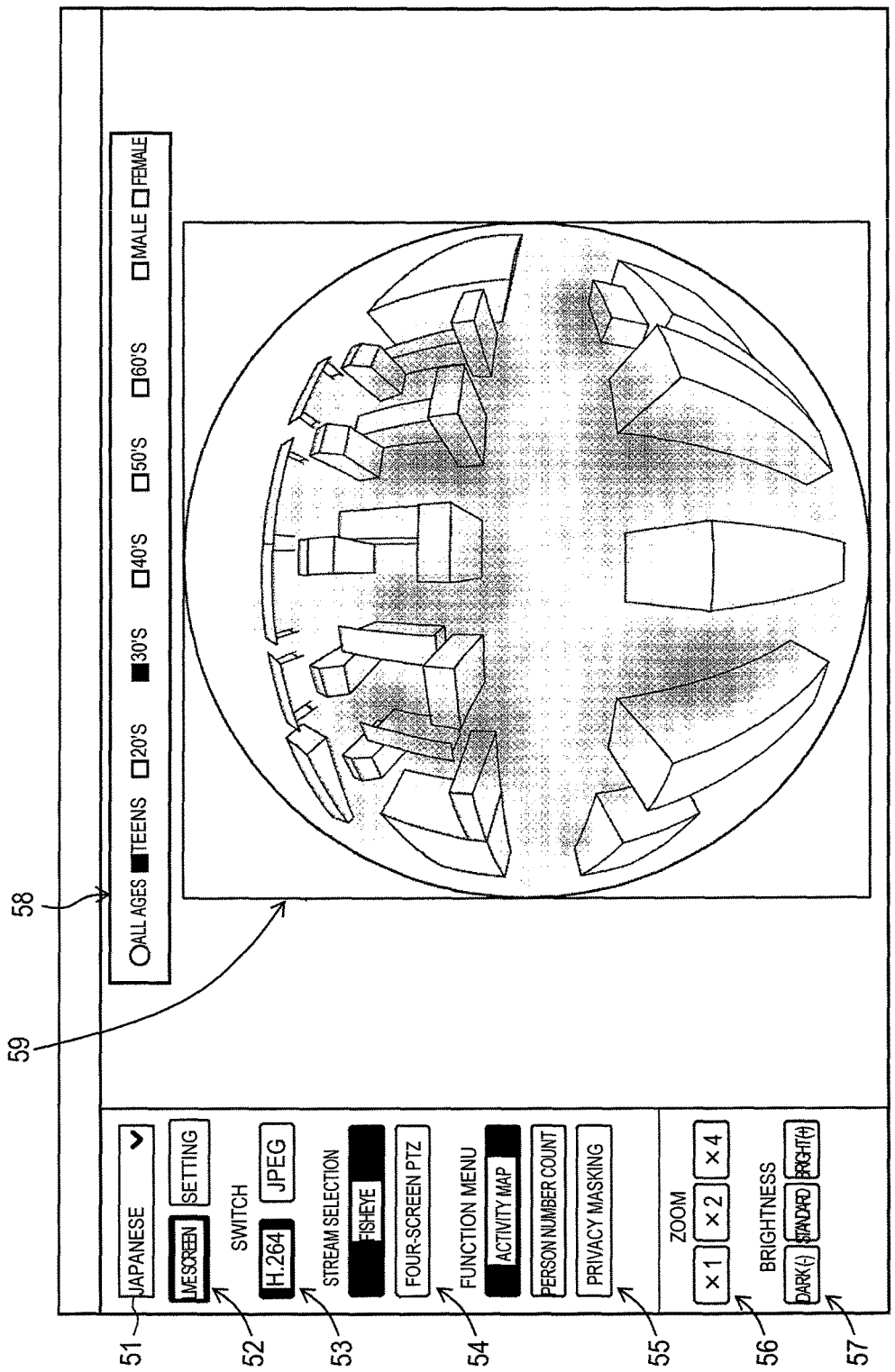
FIG. 10 is an explanatory diagram showing a monitoring screen displayed on monitor 7.

Hereinafter, a monitoring screen displayed on monitor 7 shown in FIG. 1 will be described. FIG. 10 is an explanatory diagram showing the monitoring screen displayed on monitor 7.

The monitoring screen is displayed by activating a web browser in PC 3 and accessing camera 1, and language selection section 51, operation mode selection section 52, video switch section 53, stream selection section 54, function menu selection section 55, display magnification selection section 56, brightness selection section 57, attribute designation section 58, video display selection 59 are provided on the monitoring screen. Language selection section 51 is used for selecting the language of characters displayed on the monitoring screen. The video output from camera 1 is displayed in video display section 59.

Operation mode selection section 52 is used for selecting an operation mode (monitoring and setting), and buttons of "live screen" and "setting" are provided in operation mode selection section 52. If the button of "live screen" is operated, the monitoring screen shown in FIG. 10 is displayed, and if the button of "setting" is operated, setting screens related to various setting items (see FIGS. 11 to 16) are displayed.

Video switch section 53 is used for switching a format (video compression method) of the video output from camera 1, and H.264 and motion JPEG may be selected in this example.

Stream selection section 54 is used for switching the kind of the video output from camera 1. The example shown in FIG. 10 is a case where the imaging mode in which the fisheye video and the four-screen PTZ video are output is set. Buttons of "fisheye video" and "four-screen PTZ video" may be displayed in stream selection section 54, and any one of the fisheye video and the four-screen PTZ video may be selected. If the fisheye video is selected, the fisheye video is displayed in video display section 59 as shown in FIG. 10. If the four-screen PTZ video is selected, the four-screen PTZ video is displayed in the video display section. In a case where the four-screen PTZ video is selected, the activity map is not displayed.

Function menu selection section 55 is used for selecting functions (activity map, person number count, and privacy mask), and buttons corresponding the functions are provided. If the button of "activity map" is operated, a video acquired by superimposing the activity map on the fisheye video is displayed in video display section 59 as shown in FIG. 10. If the button of "person number count" is operated, a video acquired by superimposing the characters representing the count line and the number of persons who pass through the count line for every passing direction on the fisheye video is displayed in video display section 59. If the button of "privacy mask" is operated, a video acquired by changing the image area of the person who appears in the fisheye video to the mask image is displayed in video display section 59.

Display magnification selection section 56 is used for selecting a display magnification of the video displayed on video display section 59. Brightness selection section 57 is used for selecting the brightness of the video displayed in video display section 59.

Attribute designation section 58 is used for designating the attribute (age and gender) displayed in the activity map. In the example shown in FIG. 10, one item of all ages, teens, 20s, 30s, 40s, 50s, and 60s or older or multiple items may be selected as selection items related to the age. If "all ages" is selected, other age items are not able to be selected. One item or both items of male and female may be selected as selection items related to the gender. If the attribute is designated in attribute designation section 58, a video acquired by superimposing the activity map of which the designated attribute is restricted on the fisheye video is displayed in video display section 59. Attribute designation section 58 is changed depending on the imaging mode, and attribute designation section 58 enters a non-display state or a non-selectable state in an imaging mode in which the activity map of which the attribute is restricted is not displayed, that is, in the imaging mode in which the only the fisheye video is output.

Hereinafter, a setting screen related to a basic setting item displayed on monitor 7 shown in FIG. 1 will be described. FIG. 11 is an explanatory diagram showing the basic setting screen related to the setting item displayed on monitor 7.

If the button of "setting" of operation mode selection section 52 is operated on the monitoring screen shown in FIG. 10, the setting screen shown in FIG. 11 is displayed. Setting menu selection section 61 and setting item input section 62 are provided in this setting screen.

Buttons of "basic", "camera", "moving object detection", "person number count", "user management", "network", and "schedule" are provided as setting menus on setting menu selection section 61. If the button of "basic" is operated, the setting screen shown in FIG. 11 is displayed.

If the buttons of "camera", "moving object detection", "person number count", and "user management" are operated, the setting screen is changed to the setting screens (see FIGS. 12 to 16). The setting items of the setting screens of the camera, the moving object detection, the person number count, and the user management will be described in detail below. If the buttons of "network" and "schedule" are operated, the setting screen is changed to the setting screens (not shown) of the network and the schedule. The user inputs the setting items such as an IP address and a mail notification on the setting screen of the network. The user inputs the setting items related to the selection of the operation (operation detection, image releasing, and recording) to be performed according to the schedule and the schedule (day of the week or time zone) on the setting screen of the schedule.

Hereinafter, the setting items displayed on the setting item input section 62 on the setting screen shown in FIG. 11 will be described. The language initially displayed when camera 1 is accessed is selected in the item of "language selection". The title of camera 1 is input in the item of "camera title".

The current date and time are input in the item of "date and time" of the field of "date and time". Any one of 24-hour display, 12-hour display, and a time-hidden display is selected in the item of "time display format". A display order of each value of year, month, day, hour, minute, and second is selected in the item "date display format". The characters of "move to NTP setting" are selected in the item of "NTP", and thus, the setting screen is changed to an NTP setting screen (not shown) related to a process of acquiring the current time from a time server according to Network Time Protocol (NTP). A time zone is selected in the item of "time zone". Whether or not to use a summer time is selected in the item of "summer time". A start date and time of the summer time are input in the item of "start date and time". An end date and time of the summer time are input in the item of "end date time".

Whether or not to display a character string (for example, a name of an imaging area) on the video is selected in the item of "in-screen character display". A character string displayed on the video is input in the item of "in-screen character". Positions in which the character string and the date and time set so as to be displayed in the video are selected in the video of the monitoring screen (see FIG. 10) in the item of "display position". Whether or not to display a brightness state when the brightness is adjusted on the monitoring screen in the video is selected in the item of "brightness state display". Whether or not to turn the video upside down is selected in the item of "upside down". Whether or not to turn a lamp indicating an operation state is selected in the item of "lamp display". An interval at which the state of the camera is notified by displaying a button indicating that the state of camera 1 is changed on the monitoring screen is selected in the item of "state notification interval". In a case where the state notification interval is set in the item of "state notification reception port number" in real time, a reception port number which is a notification destination to which the state is notified is input.

Whether or not to permit the automatic installation of display plug-in software in PC 3 from camera 1 is selected in the item of "automatic install" in the field of "plug-in software". When the video is displayed by the display plug-in software, whether or not to perform a smooth display for smoothly displaying the video which is output from camera 1 and is temporarily accumulated in PC 3 is selected in the item of "live screen smooth display (buffering)". Whether or not to permit display output for monitor 7 is selected in the item of "monitor output".

Figure 12:
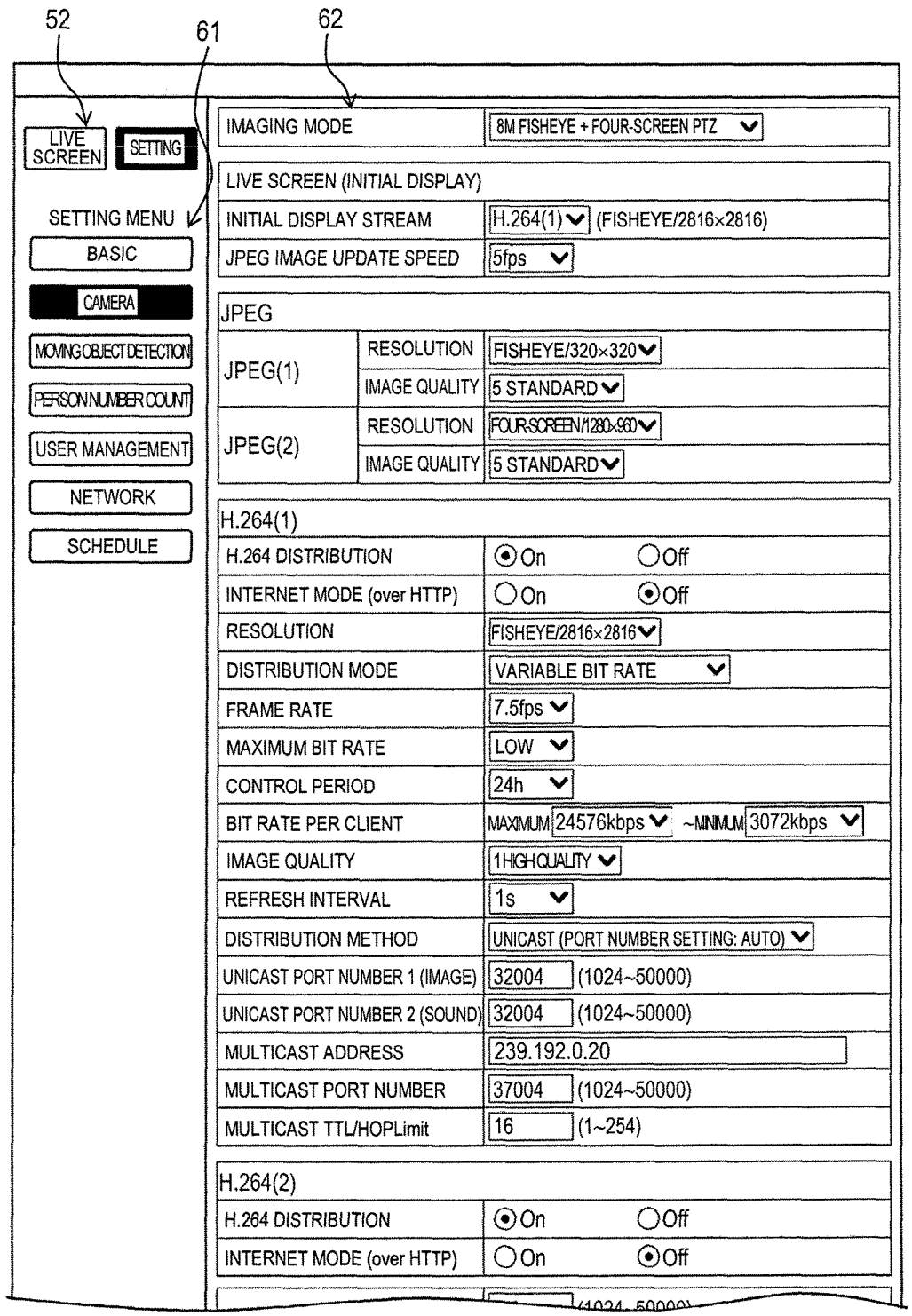
FIG. 12 is an explanatory diagram showing a setting screen related to a video output of camera 1 displayed on monitor 7.

Hereinafter, a setting screen related to a video output of camera 1 displayed on monitor 7 shown in FIG. 1 will be described. FIGS. 12 and 13 are explanatory diagram showing the setting screen related to the video output of camera 1 displayed on monitor 7.

This setting screen is used for performing the setting related to the video output of camera 1, and is displayed in setting menu selection section 61 by operating the button of "camera". Hereinafter, setting items of setting item input section 62 will be described.

The imaging mode is selected in the item of "imaging mode". In the present embodiment, at least two imaging modes of the first imaging mode in which only the fisheye video is output and the second imaging mode in which the fisheye video and the four-screen PTZ video are output are provided. In addition, the imaging mode includes, for example, an imaging mode in which only the double-panorama video is output, an imaging mode in which only the single-panorama video is output, an imaging mode in which only the four-screen PTZ video is output, an imaging mode in which only the one-screen PTZ mode is output, an imaging mode in which the fisheye video and the double-panorama video are output, and an imaging mode in which the fisheye video and the single-panorama video are output.

The kind (JPEG(1), JPEG(2), H.264(1), or H.264(2)) of the video initially displayed on the monitoring screen (see FIG. 10) is selected in the item of "initial display stream" in the field of "live view (initial display)". A speed (fps) at which a JPEG image is updated is selected in the item of "JPEG image update speed".

When the JPEG video is displayed on the monitoring screen (see FIG. 10), a resolution of the video initially displayed is selected in the item of "resolution" in the field of "JPEG". A quality (best quality, high quality, standard, or low quality) of the JPEG video in each resolution is selected in the item of "image quality".

Whether or not to distribute (output) the video of H.264 is selected in the item of "H.264 distribution" in the field of "H.264". Whether or not to distribute the video of H.264 via the Internet is selected in the item of "Internet mode (over HTTP)". The resolution of the video of H.264 is selected in the item of "resolution". A distribution mode (variable bit rate or constant bit rate) of the video of H.264 is selected in the item of "distribution mode". A frame rate of the video of H.264 is selected in the item of "frame rate". The maximum bit rate at the variable bit rate is selected in the item of "maximum bit rate". A control period at the variable bit rate is selected in the item of "control period". The bit rate of the video of H.264 for one client is selected in the item of "bit rate per client". The quality (giving priority to movement, standard, or giving priority to image quality) of the video of H.264 is selected in the item of "image quality". An interval at which the video of H.264 is refreshed is selected in the item of "refresh interval".

A distribution method (unicast or multicast) of the video of H.264 is selected in the item of "distribution method". Unicast port numbers used when a video and a sound are transmitted from camera 1 are input in the item of "unicast port number 1 (image)" and "unicast port number 2 (sound)". An IP address which is a transmission destination of the video and the sound in multicast is input in the item of "multicast address". A multicast port number used when the video is transmitted from camera 1 is input in the item of "multicast port number". A TTL/HOPLimit value of multicast is input in the item of "multicast TTL/HOPLimit".

In the present embodiment, it is possible to simultaneously output two kinds of videos for each format (video compression method) from camera 1, and it is possible to set two kinds of videos (JPEG(1) and JPEG(2)) for the format of motion JPEG. It is possible to set two kinds of videos (H.264(1) and H.264(2)) for the format of H.264.

Figure 14:
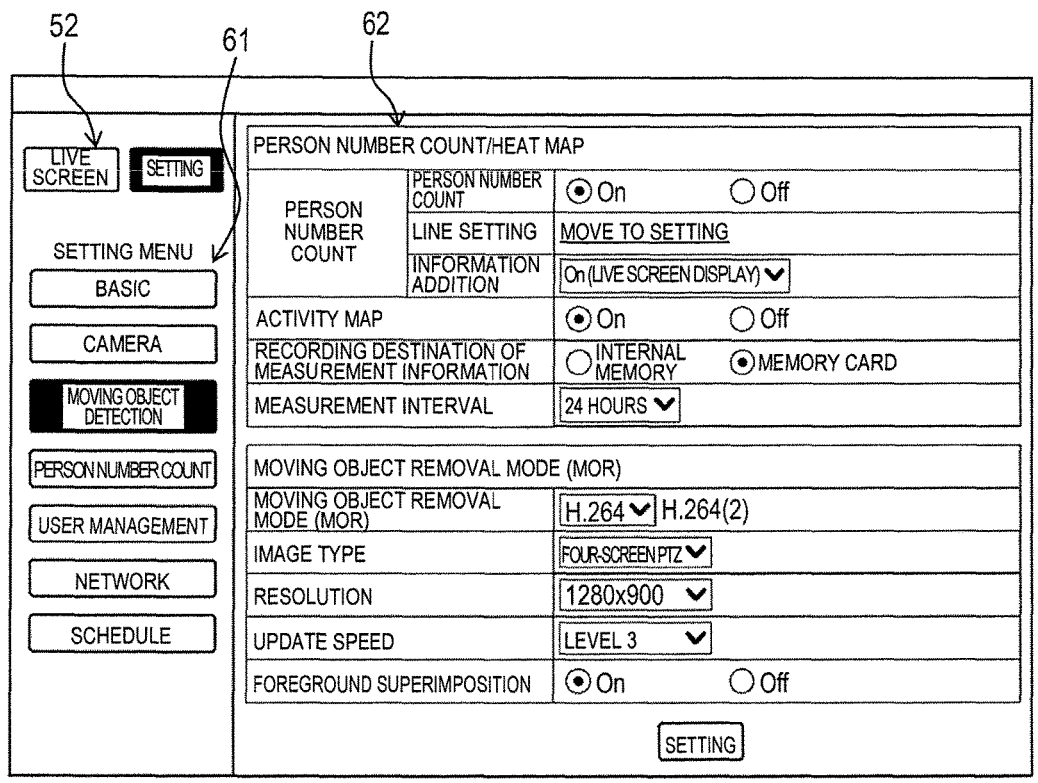
FIG. 14 is an explanatory diagram showing a setting screen related to moving object detection displayed on monitor 7.

Hereinafter, a setting screen related to moving object detection displayed on monitor 7 shown in FIG. 1 will be described. FIG. 14 is an explanatory diagram showing a setting screen related the moving object detection displayed on monitor 7.

This setting screen is used for performing the setting related to the moving object detection, and is displayed by operating the button of "moving object detection in setting menu selection section 61. Hereinafter, setting items of setting item input section 62 will be described.

Whether or not to use the function of the person number count is selected in the item of "person number count". In this example, if the person number count is turned on, the button of "person number count" is displayed in function menu selection section 55 of the monitoring screen (see FIG. 10). The characters of "move to setting" are selected in the item of "line setting", the setting screen is changed to the setting screen (see FIG. 15) related to the line setting. Whether to output the video to which operation detection information is output or display the video on which the operation detection information is superimposed on the monitoring screen is selected in the item of "information addition".

Whether or not to use the function of the activity map is selected in the item of "activity map". In this example, if the activity map is turned on, the button of "activity map" is displayed in function menu selection section 55 of the monitoring screen (see FIG. 10). A recording destination of measurement information of the person number count and the activity map is selected in the item of "recording destination of measurement information". A measurement interval (15 minutes, 1 hour, 12 hours, or 24 hours) of the person number count and the activity map is designated in the item of "measurement interval".

The format (JPEG, H.264, or OFF) of the video which is a target of moving object removal (privacy masking process) is selected in the item of "moving object removal mode". The kind (fisheye video or four-screen PTZ video) of the video which is the target of the moving object removal is selected in the item of "image type". The resolution of the video to be output is selected in the item of "resolution". The update speed (levels 1 to 5) of the video is selected in the item of "update speed". Whether or not to perform foreground superimposition (process of superimposing the mask image of the person on the background image) is selected in the item of "foreground superimposition". In this example, if the foreground superimposition is turned off, the video in which the person is removed is output.

Figure 15:
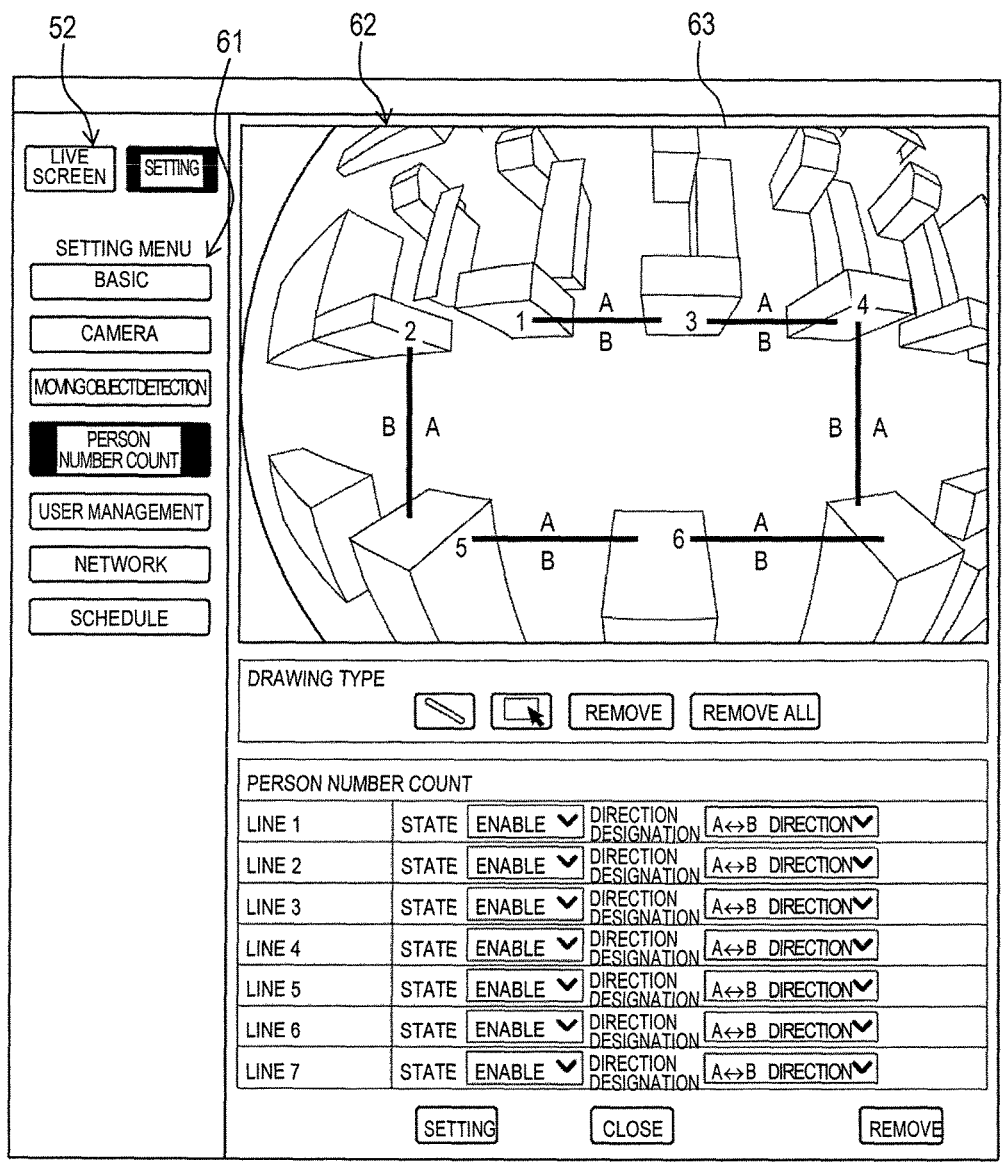
FIG. 15 is an explanatory diagram showing a setting screen related to line setting displayed on monitor 7.

Hereinafter, a setting screen related to line setting displayed on monitor 7 shown in FIG. 1 will be described. FIG. 15 is an explanatory diagram showing a setting screen related to the line setting displayed on monitor 7.

This setting screen is used for performing the setting related to the count line used for counting the number of persons, and is displayed by operating the characters of "move to setting" in the field of the line setting on the setting screen related to the moving object detection shown in FIG. 14. Hereinafter, setting items of setting item input section 62 will be described.

Video display section 63 is provided in setting item input section 62. The fisheye video is displayed in video display section 63. A pen icon, a selection icon, and buttons of "remove" and "remove all" are provided in the field of "drawing type". If the pen icon is operated, the count line may be drawn on the fisheye video displayed on video display section 63. If the selection icon is operated, the previously drawn count line may be selected. If the button of "remove" is operated, the selected count line is removed.

If the button of "remove all" is operated, all the previously drawn count lines are removed.

Whether to enable or disable each set count line is selected in the item of "state" in the field of "person number count". A passing direction in which the number of persons is measured in each set count line is selected in the item of "direction designation". If the button of "setting" is operated, an input content is determined. If the button of "close" is operated, the setting screen related to the line setting is closed, and the setting screen is returned to the setting screen related to the moving object detection shown in FIG. 14. If the button of "remove" is operated, all the input contents are removed.

Figure 16:
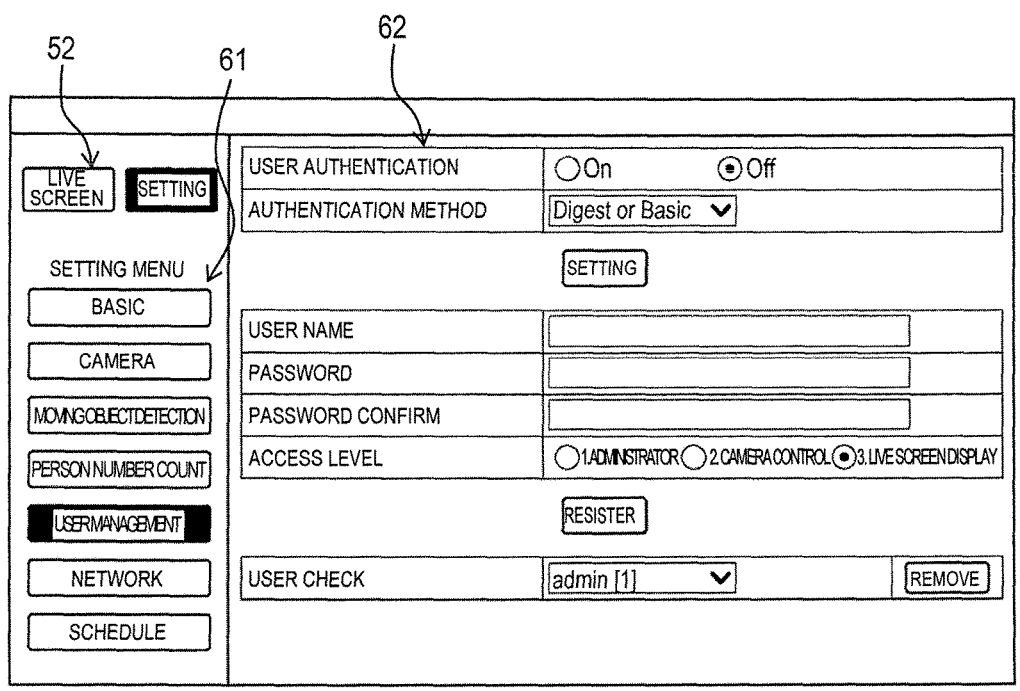
FIG. 16 is an explanatory diagram showing a setting screen related to user management displayed on monitor 7.

Hereinafter, a setting screen related to user management displayed on monitor 7 shown in FIG. 1 will be described. FIG. 16 is an explanatory diagram showing the setting screen related to the user management displayed on monitor 7.

This setting screen is used for performing the setting related to the user authentication for restricting the user who can access camera 1 from PC 3, and is displayed by operating the button of "user management" in setting menu selection section 61. Hereinafter, setting items of setting item input section 62 will be described.

Whether or not to perform the user authentication is selected in the item of "user authentication". An authentication method (digest authentication or basic authentication) used in the user authentication is selected in the item of "authentication method". If the button of "setting" is operated, an input content is determined.

A user name is input in the item of "user name". A password is input in the items of "password" and "password confirm". An access level (administrator, camera control, or live screen display) of the user is selected in the item of "access level". With the level of "camera control", the operation of camera 1 and the display of the video output from camera 1 are able to be performed, but the setting of camera 1 is not able to be performed. With the level of "live screen display", only the display of the video output from camera 1 is able to be performed, and the operation and the setting of camera 1 are not able to be performed. If the button of "register" is operated, the input content is confirmed.

It is possible to check the registered user in the item of "user check" through pull-down menu. In this example, if the user is selected and the button of "remove" is operated, the user is removed.

As stated above, in the present embodiment, the image-capturing device includes: imager 21 that images the monitoring area, and outputs the video of the monitoring area according to the imaging mode; input setter 36 that sets the imaging mode and the attribute of the person in response to the operation input of the user; positional information acquirer 24 that detects the persons from the video, and acquires the positional information for every person; attribute information acquirer 26 that detects the persons from the video, determines the attribute for every person, and acquires the attribute information for every person; activity information acquirer 29 that restricts the activity information corresponding to the position within the monitoring area to the attribute set by input setter 36 based on the attribute information and the positional information, and acquires the activity information of which the attribute is restricted; activity map generator 31 that generates the activity map of which the attribute is restricted based on the activity information; video output unit 35 that generates the video acquired by superimposing the activity map on the video of the monitoring area, and outputs the generated video; and activity map activity map controller 32 that performs the control related to the output of the activity map. Activity map controller 32 determines the appropriateness indicating whether or not the video output from imager 21 according to the imaging mode is appropriate in acquiring the attribute information, enables the function of outputting the activity map of which the attribute is restricted in a case where it is determined that the video output from the imager has the appropriateness, and disables the function of outputting the activity map of which the attribute is restricted in a case where it is determined that the video output from the imager does not have the appropriateness.

Accordingly, since the output video acquired by superimposing the activity map of which the attribute is restricted on the video of the monitoring area is output from camera (image-capturing device) 1, it is possible to display the activity map of which the attribute is restricted without providing a dedicated analysis device. In a case where the video output from imager 21 is not appropriate in acquiring the attribute information, since the attribute information is not able to be accurately acquired, the activity map of which the attribute is restricted is output in a state in which the accuracy thereof is low, and thus, there is a concern that the user performs erroneous determination. However, in a case where the video output from imager 21 is not appropriate in acquiring the attribute information, since it is possible to prevent the user from performing the erroneous determination by disabling the function of outputting the activity map of which the attribute is restricted, it is possible to improve the usability of the user.

In the present embodiment, in a case where it is determined that the video output from the imager does not have the appropriateness, activity map controller 32 causes activity information acquirer 29 to acquire the activity information of which the attribute is not restricted, causes activity map generator 31 to generate the activity map of which the attribute is not restricted, and causes video output unit 35 to output the video acquired by superimposing the activity map of which the attribute is not restricted on the video of the monitoring area.

Accordingly, even in a case where the video output from imager 21 is not appropriate in acquiring the attribute information, since the activity map of which the attribute is not restricted is output, it is possible to improve the usability of the user.

In the present embodiment, imager 21 images the monitoring area through the fisheye lens, outputs the fisheye video, and outputs the correction video acquired by performing the distortion correction on the fisheye video, and activity map controller 32 determines that the video output from the imager does not have the appropriateness in a case where the video output from the imager 21 is only the fisheye video.

Accordingly, since the attribute information is not able to be accurately acquired in the fisheye video and the attribute information is able to be accurately acquired in the correction video acquired by performing the distortion correction on the video, in a case where the video output from imager 21 is only the fisheye video, it is determined that the video output from the imager does not have the appropriateness, and disables the function of outputting the activity map of which the attribute is restricted. Thus, since it is possible to prevent the user from performing the erroneous determination, it is possible to improve the usability of the user.

In the present embodiment, imager 21 images the monitoring area through a fisheye lens, outputs a fisheye video, and outputs a correction video acquired by performing distortion correction on the fisheye video, and activity map controller 32 determines that the video output from imager 21 has the appropriateness in a case where the video output from the imager includes the correction video.

Accordingly, since the attribute information is not able to be accurately acquired in the fisheye video and the attribute information is able to be accurately acquired in the correction video acquired by performing the distortion correction on the video, in a case where the video output from imager 21 is only the correction video, it is determined that the video output from the imager has the appropriateness, and enables the function of outputting the activity map of which the attribute is restricted. Thus, it is possible to reliably output the activity map of which the attribute is restricted with high accuracy.

In the present embodiment, the image-capturing device includes: imager 21 that outputs the first unprocessed video acquired by imaging the monitoring area and the second video acquired by cutting a part of the first video and performing the distortion correction on the cut part according to the imaging mode; input setter 36 that sets the imaging mode and the attribute of the person in response to the operation input of the user; positional information acquirer 24 that detects the persons from the first video, and acquires the positional information on the first video for every person; attribute information acquirer 26 that detects the persons from the second video, determines the attribute for every person, and acquires the attribute information for every person; identification processor 28 that performs the process of correlating the positional information and the attribute information with each person; activity information acquirer 29 that restricts the activity information corresponding to the position within the monitoring area to the attribute set by input setter 36 based on the positional information and the attribute information correlated by identification processor 28, and acquires the activity information of which the attribute is restricted; activity map generator 31 that generates the activity map of which the attribute is restricted based on the activity information; and video output unit 35 that generates the video acquired by superimposing the activity map on the first video, and outputs the generated video.

Accordingly, since the output video acquired by superimposing the activity map of which the attribute is restricted on the video of the monitoring area is output from camera (image-capturing device) 1, it is possible to display the activity map of which the attribute is restricted without providing a dedicated analysis device. Since the attribute information is acquired using the second video acquired by performing the distortion correction, it is possible to output the activity map of which the attribute is restricted with high accuracy. Thus, since it is possible to prevent the user from performing the erroneous determination caused by outputting the activity map of which the attribute is restricted with low accuracy, it is possible to improve the usability of the user. Since the overall imaging area is photographed on the first video, the activity map is superimposed on the first video, and thus, it is possible to recognize the activity state of the person of which the attribute is restricted in a wide range. Accordingly, it is possible to improve the usability of the user.

In the present embodiment, positional information acquirer 24 correlates the positional information for every person with detection time information on the first video for every person, and acquires the correlated positional information, attribute information acquirer 26 correlates the attribute information for every person with positional information and detection time information on the second video, and acquires the correlated attribute information, and identification processor 28 performs a process of correlating the positional information and the attribute information with each person based on the positional information and the detection time information respectively acquired by positional information acquirer 24 and attribute information acquirer 26.

Accordingly, since the positional information acquired on the first video and the attribute information acquired from the second video are able to be accurately correlated with each other, it is possible to further improve the accuracy of the activity map of which the attribute is restricted.

In the present embodiment, imager 21 outputs, as the first video, a fisheye video acquired by imaging a monitoring area through a fisheye lens, cuts videos of a plurality of target areas set in response to an operation input of a user from the first video, performs distortion correction on the plurality of videos, and outputs, as the second video, a plurality of correction videos acquired through the distortion correction.

Accordingly, since the attribute information is able to be acquired for the person who appears in the first video without being missed by setting the area in which the person passes in the monitoring area as the target area of the second video, it is possible to output the activity map of which the attribute is restricted with high accuracy.

Second Embodiment

Figure 17:
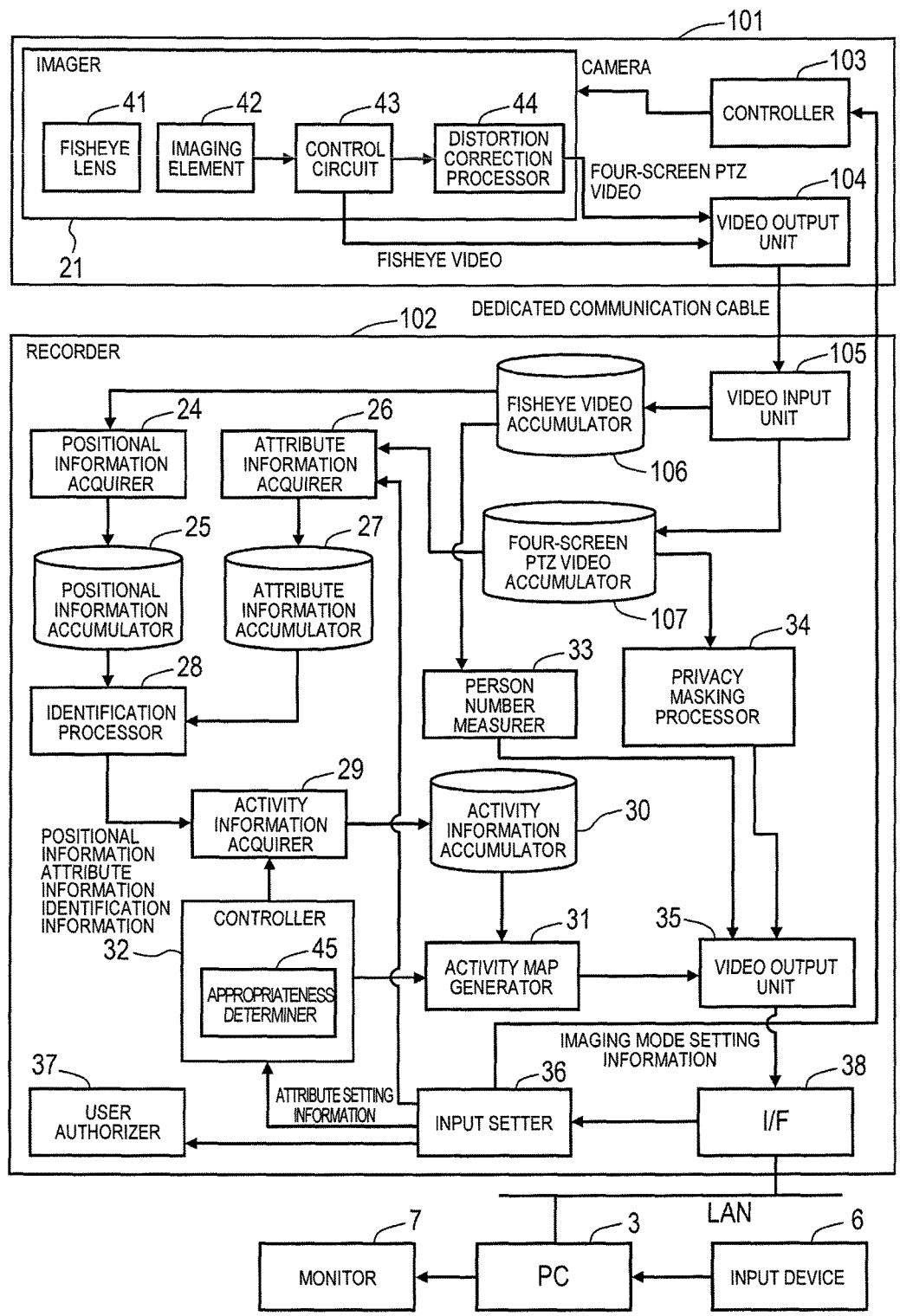
FIG. 17 is a functional block diagram showing a schematic configuration of camera 101 and recorder 102 according to a second embodiment.

Hereinafter, a monitoring system according to a second embodiment will be described. The portions which are not particularly mentioned herein are the same as those of the above-described embodiment. FIG. 17 is a functional block diagram showing a schematic configuration of camera 101 and recorder 102 according to the second embodiment.

Although it has been described in the first embodiment (see FIG. 6) that camera 1 is the so-called network camera (IP camera) capable of being connected to the network, camera 101 is connected to recorder 102 through a dedicated communication cable (for example, coaxial cable) in the second embodiment. Recorder (recording device) 102 is capable of being connected to the network, and is connected to PC 3 through the LAN installed in the store.

In the second embodiment, positional information acquirer 24, positional information accumulator 25, attribute information acquirer 26, attribute information accumulator 27, identification processor 28, activity information acquirer 29, activity information accumulator 30, activity map generator 31, activity map controller 32, person number measurer 33, Privacy masking processor 34, video output unit 35, input setter 36, user authorizer 37, and interface 38 which are provided in camera 1 in the first embodiment are provided in recorder 102. Camera 101 outputs the video output from imager 21 to recorder 102 from video output unit 104 with no change, and recorder 102 inputs the video input from camera 101 to fisheye video accumulator 22 and four-screen PTZ video accumulator 23 through video input unit 105.

Imaging mode setting information related to an imaging mode set by input setter 36 of recorder 102 is transmitted to camera 101 from recorder 102 in response to the operation input of the user using input device 6 of PC 3, and controller 103 controls imager 21 based on the imaging mode setting information.

The respective units of recorder 102 perform the same processes as those of the first embodiment, and an activity map superimposition video, a person number count video, a masking-processed video, and an unprocessed video are output to PC 3 from recorder 102. A high-capacity storage device, for example, a hard disk drive is adopted to fisheye video accumulator 106 and four-screen PTZ video accumulator 107, and videos are accumulated for a long period.

Third Embodiment

Figure 18:
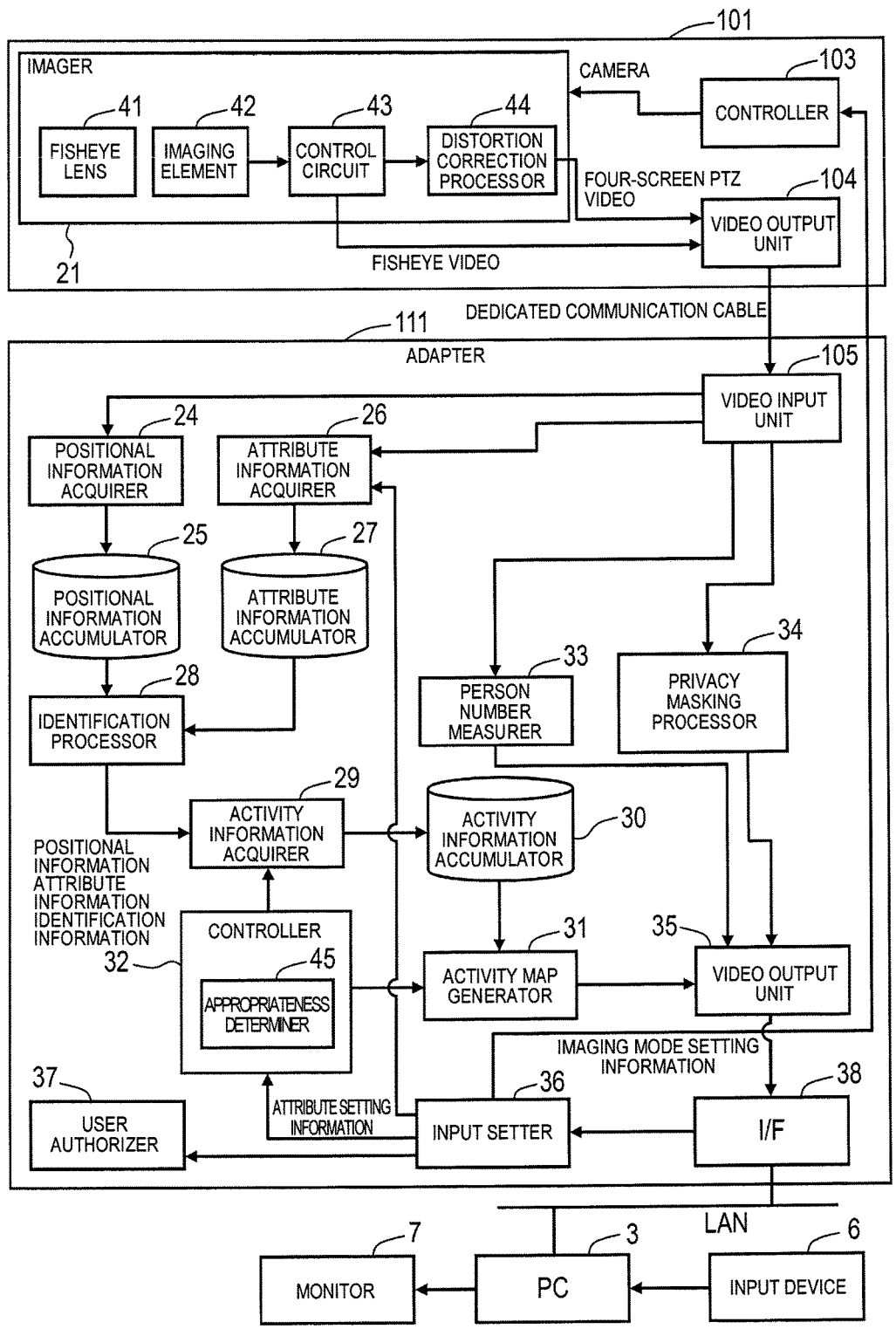
FIG. 18 is a functional block diagram showing a schematic configuration of adapter 111 according to a third embodiment.

Hereinafter, a monitoring system according to a third embodiment will be described. The portions which are not particularly mentioned herein are the same as those of the above-described embodiment. FIG. 18 is a functional block diagram showing a schematic configuration of adapter 111 according to the third embodiment.

In the third embodiment, adapter (video output control device) 111 that is connected to camera 101 and controls an output of a video to PC 3 is provided between camera 101 and PC 3. Camera 101 and adapter 111 are connected through a dedicated communication cable, and adapter 111 and PC 3 are connected via the LAN.

Adapter 111 is acquired by omitting fisheye video accumulator 106 and four-screen PTZ video accumulator 107 from recorder 102 (see FIG. 17) according to the second embodiment, and functions as a network converter that connects camera 101 having a configuration in which the video is output through the dedicated communication cable to the network. The respective units of adapter 111 perform the same processes as those of the second embodiment, and an activity map superimposition video, a person number count video, a masking-processed video, and an unprocessed video are output to PC 3 from adapter 111.

Storage devices such as fisheye video accumulator 22 and four-screen PTZ video accumulator 23 provided in camera 1 according to the first embodiment, for example, a memory card, a hard disk drive, and a solid-state drive may be built in adapter 111, and most recent videos may be accumulated in a storage capacity range.

While the present disclosure has been described with reference to the particular embodiments, these embodiments have been presented by way of example only. The present disclosure is not limited to these embodiments. All the components of the image-capturing device, the recording device, and the video output control device according to the present disclosure illustrated in the above-described embodiments are not necessarily essential, and may be appropriately selected without departing from at least the scope of the present disclosure.

For example, although the examples of the retail store such as the supermarket or the convenience store have been described in the above-described embodiment, the present disclosure is not limited to such retail stores. The present disclosure may be applied to other business types of stores other than the retail stores, for example, restaurants or banks. The present disclosure may be applied to the purpose of use with a monitoring area other than the store as its target.

It has been described in the above-described embodiment that PC 3 in the store connected to camera 1, recorder 102, and adapter 111 through the LAN installed in the store is used as the browsing device that browses the video of the inside of the store. PC 11 in the head office may be used as the browsing device by connecting PC 11 in the head office to camera 1, recorder 102, and adapter 111 via a network outside the store, that is, a wide area network such as WAN as shown in FIG. 1. Alternatively, a portable terminal such as smartphone 13 or tablet terminal 14 may be used as the browsing device, and thus, the video of the inside of the store may be browsed at an arbitrary place such as a place where the user visits in addition to the store or the head office.

Although it has been described in the above-described embodiment that camera 1, recorder 102, or adapter 111 performs necessary processes, the necessary processes may be performed by PC 11 provided in the head office or cloud computer 12 constituting a cloud computing system as shown in FIG. 1. The necessary processes may be performed by a plurality of information processing devices, and information items may be delivered between the plurality of information processing devices through a communication medium such as an IP network or LAN. In this case, the plurality of information processing devices that performs the necessary processes constitutes the monitoring system.

INDUSTRIAL APPLICABILITY

The image-capturing device, the recording device, and the video output control device according to the present disclosure can exhibit the advantages capable of displaying the activity map of which the attribute is restricted without providing the dedicated analysis device and improving the usability of the user when the activity map of which the attribute is restricted is browsed, and can be used as the image-capturing device that images the monitoring area and outputs the video of the monitoring area to the browsing device, the recording device that accumulates the video output from the image-capturing device and outputs the video to the browsing device, and the video output control device that is connected to the image-capturing device and controls the output of the video to the browsing device.

REFERENCE MARKS IN THE DRAWINGS

1: camera (image-capturing device)
2: recorder
3: PC (browsing device)
6: input device
7: monitor
11: PC
12: cloud computer
13: smartphone
14: tablet terminal
21: imager
24: positional information acquirer
26: attribute information acquirer
28: identification processor
29: activity information acquirer
31: activity map generator
32: activity map controller
35: video output unit
36: input setter
41: fisheye lens
42: imaging element
43: control circuit
44: distortion correction processor
45: appropriateness determiner
102: recorder (recording device)
111: adapter (video output control device)

The invention claimed is:
1. An image-capturing device that images a monitoring area, and outputs a video of the monitoring area to a browsing device, the device comprising:

an imager that images the monitoring area, and outputs the video of the monitoring area according to an imaging mode;

an input setter that sets the imaging mode and an attribute of a person in response to an operation input of a user;

a positional information acquirer that detects persons from the video, and acquires positional information for every person;

an attribute information acquirer that detects persons from the video, determines an attribute for every person, and acquires attribute information for every person;

an activity information acquirer that restricts activity information corresponding to a position within the monitoring area to the attribute set by the input setter based on the attribute information and the positional information, and acquires the activity information of which the attribute is restricted;

an activity map generator that generates an activity map of which the attribute is restricted based on the activity information;

a video output unit that generates a video acquired by superimposing the activity map on the video of the monitoring area, and outputs the generated video; and a controller that performs control related to an output of the activity map, wherein the controller determines appropriateness indicating whether or not the video output from the imager according to the imaging mode is appropriate in acquiring the attribute information, enables a function of outputting the activity map of which the attribute is restricted in a case where it is determined that the video output from the imager has the appropriateness, and disables the function of outputting the activity map of which the attribute is restricted in a case where it is determined that the video output from the imager does not have the appropriateness.

2. The image-capturing device of claim 1, wherein, in a case where it is determined that the video output from the imager does not have the appropriateness, the controller causes the activity information acquirer to acquire activity information of which an attribute is not restricted, causes the activity map generator to generate an activity map of which the attribute is not restricted, and causes the video output unit to output a video acquired by superimposing the activity map of which the attribute is not restricted on the video of the monitoring area.

3. The image-capturing device of claim 2, wherein the imager images the monitoring area through a fisheye lens, outputs a fisheye video, and outputs a correction video acquired by performing distortion correction on the fisheye video, and the controller determines that the video output from the imager does not have the appropriateness in a case where the video output from the imager is only the fisheye video.

4. The image-capturing device of claim 2, wherein the imager images the monitoring area through a fisheye lens, outputs a fisheye video, and outputs a correction video acquired by performing distortion correction on the fisheye video, and the controller determines that the video output from the imager has the appropriateness in a case where the video output from the imager includes the correction video.

5. The image-capturing device of claim 1, wherein the imager images the monitoring area through a fisheye lens, outputs a fisheye video, and outputs a correction video acquired by performing distortion correction on the fisheye video, and the controller determines that the video output from the imager does not have the appropriateness in a case where the video output from the imager is only the fisheye video.

6. The image-capturing device of claim 1, wherein the imager images the monitoring area through a fisheye lens, outputs a fisheye video, and outputs a correction video acquired by performing distortion correction on the fisheye video, and the controller determines that the video output from the imager has the appropriateness in a case where the video output from the imager includes the correction video.

7. An image-capturing device that images a monitoring area, and outputs a video of the monitoring area to a browsing device, the device comprising:

an imager that outputs a first unprocessed video acquired by imaging the monitoring area and a second video acquired by cutting a part of the first video and performing distortion correction on the cut part according to an imaging mode;

an input setter that sets the imaging mode and an attribute of a person in response to an operation input of a user;

a positional information acquirer that detects persons from the first video, and acquires positional information on the first video for every person;

an attribute information acquirer that detects persons from the second video, determines an attribute for every person, and acquires attribute information for every person;

an identification processor that performs a process of correlating the positional information and the attribute information with each person;

an activity information acquirer that restricts activity information corresponding to a position within the monitoring area to the attribute set by the input setter based on the positional information and the attribute information correlated by the identification processor, and acquires the activity information of which the attribute is restricted;

an activity map generator that generates an activity map of which the attribute is restricted based on the activity information; and a video output unit that generates a video acquired by superimposing the activity map on the first video, and outputs the generated video.

8. The image-capturing device of claim 7, wherein the positional information acquirer correlates the positional information for every person with detection time information on the first video for every person, and acquires the correlated positional information, the attribute information acquirer correlates the attribute information for every person with positional information and detection time information on the second video, and acquires the correlated attribute information, and the identification processor performs a process of correlating the positional information and the attribute information with each person based on the positional information and the detection time information respectively acquired by the positional information acquirer and the attribute information acquirer.

9. The image-capturing device of claim 8,
wherein the imager outputs, as the first video, a fisheye video acquired by imaging a monitoring area through a fisheye lens, cuts videos of a plurality of target areas set in response to an operation input of a user from the first video, performs distortion correction on the plurality of videos, and outputs, as the second video, a plurality of correction videos acquired through the distortion correction.

10. The image-capturing device of claim 7,
wherein the imager outputs, as the first video, a fisheye video acquired by imaging a monitoring area through a fisheye lens, cuts videos of a plurality of target areas set in response to an operation input of a user from the first video, performs distortion correction on the plurality of videos, and outputs, as the second video, a plurality of correction videos acquired through the distortion correction.

11. A recording device that accumulates a video output from an image-capturing device, and outputs the video to a browsing device, the device comprising:
a video input unit that receives the video, which is acquired by the image-capturing device which images the monitoring area, from the image-capturing device according to an imaging mode;
a video accumulator that accumulates the video received by the video input unit;
an input setter that sets the imaging mode and an attribute of a person in response to an operation input of a user;
a positional information acquirer that detects persons from the video accumulated in the video accumulator, and acquires positional information for every person;
an attribute information acquirer that detects persons from the video accumulated in the video accumulator, determines an attribute for every person, and acquires attribute information for every person;
an activity information acquirer that restricts activity information corresponding to a position within the monitoring area to the attribute set by the input setter based on the attribute information and the positional information, and acquires the activity information of which the attribute is restricted;
an activity map generator that generates an activity map of which the attribute is restricted based on the activity information;
a video output unit that generates a video acquired by superimposing the activity map on the video of the monitoring area, and outputs the generated video; and
a controller that performs control related to an output of the activity map,
wherein the controller determines appropriateness indicating whether or not the video output from the image-capturing device according to the imaging mode is appropriate in acquiring the attribute information, enables a function of outputting the activity map of which the attribute is restricted in a case where it is determined that the video output from the image has the appropriateness, and disables the function of outputting the activity map of which the attribute is restricted in a case where it is determined that the video output from the imager does not have the appropriateness.

12. A recording device that accumulates a video output from an image-capturing device, and outputs the video to a browsing device, the device comprising:
a video input unit that receives a first unprocessed video, which is acquired by the image-capturing device which images a monitoring area, and a second video, which is acquired by the image-capturing device that cuts a part of the first video and performs distortion correction on the cut part, from the image-capturing device according to an imaging mode;
a video accumulator that accumulates the first video and the second video received by the video input unit;
an input setter that sets the imaging mode and an attribute of a person in response to an operation input of a user;
a positional information acquirer that detects persons from the first video, and acquires positional information on the first video for every person;
an attribute information acquirer that detects persons from the second video, determines an attribute for every person, and acquires attribute information for every person;
an identification processor that performs a process of correlating the positional information and the attribute information with each person;
an activity information acquirer that restricts activity information corresponding to a position within the monitoring area to the attribute set by the input setter based on the positional information and the attribute information correlated by the identification processor, and acquires the activity information of which the attribute is restricted;
an activity map generator that generates an activity map of which the attribute is restricted based on the activity information;
a video output unit that generates a video acquired by superimposing the activity map on the first video, and outputs the generated video.

13. A video output control device that is connected to an image-capturing device, and controls an output of a video to a browsing device, the device comprising:
a video input unit that receives a video, which is acquired by the image-capturing device which images a monitoring area, from the image-capturing device according to an imaging mode;
an input setter that sets the imaging mode and an attribute of a person in response to an operation input of a user;
a positional information acquirer that detects persons from the video received by the video input unit, and acquires positional information for every person;
an attribute information acquirer that detects persons from the video received by the video input unit, determines an attribute for every person, and acquires attribute information for every person;
an activity information acquirer that restricts activity information corresponding to a position within the monitoring area to the attribute set by the input setter based on the attribute information and the positional information, and acquires the activity information of which the attribute is restricted;
an activity map generator that generates an activity map of which the attribute is restricted based on the activity information;
a video output unit that generates a video acquired by superimposing the activity map on the video of the monitoring area, and outputs the generated video; and
a controller that performs control related to an output of the activity map,
wherein the controller determines appropriateness indicating whether or not the video output from the image-capturing device according to the imaging mode is appropriate in acquiring the attribute information, enables a function of outputting the activity map of which the attribute is restricted in a case where it is determined that the video output from the imager has the appropriateness, and disables the function of outputting the activity map of which the attribute is restricted in a case where it is determined that the video output from the imager does not have the appropriateness.

14. A video output control device that is connected to an image-capturing device, and controls an output of a video to a browsing device, the device comprising:
  a video input unit that receives a first unprocessed video, which is acquired by the image-capturing device which images a monitoring area, and a second video, which is acquired by the image-capturing device which cuts a part of the first video and performs distortion correction on the cut part, from the image-capturing device according to an imaging mode;
  an input setter that sets the imaging mode and an attribute of a person in response to an operation input of a user;
  a positional information acquirer that detects persons from the first video received by the video input unit, and acquires positional information on the first video for every person;
  an attribute information acquirer that detects persons from the second video received by the video input unit, determines an attribute for every person, and acquires attribute information for every person;
  an identification processor that performs a process of correlating the positional information and the attribute information with each person;
  an activity information acquirer that restricts activity information corresponding to a position within the monitoring area to the attribute set by the input setter based on the positional information and the attribute information correlated by the identification processor, and acquires the activity information of which the attribute is restricted;
  an activity map generator that generates an activity map of which the attribute is restricted based on the activity information;
  a video output unit that generates a video acquired by superimposing the activity map on the first video, and outputs the generated video.

* * * * *